US005090008A

United States Patent [19]

Clark et al.

[11] Patent Number: 5,090,008
[45] Date of Patent: Feb. 18, 1992

[54] ERASABLE RECORDING MEDIA

[75] Inventors: Bryan K. Clark; Sheryl L. Johnson, both of Sunnyvale; Robert Guerra, Santa Clara, all of Calif.

[73] Assignee: Tandy Corporation, Ft. Worth, Tex.

[21] Appl. No.: 516,509

[22] Filed: Apr. 30, 1990

Related U.S. Application Data

[63] Continuation-in-part of Ser. No. 357,377, May 25, 1989, abandoned, which is a continuation-in-part of Ser. No. 294,723, Jan. 10, 1989, which is a continuation-in-part of Ser. No. 153,288, Feb. 5, 1988, abandoned, and a continuation-in-part of Ser. No. 414,041, Sep. 28, 1989, and a continuation-in-part of Ser. No. 414,044, Sep. 28, 1989.

[51] Int. Cl.$^5$ .............. G11B 7/24; G11B 7/00; G01D 15/34
[52] U.S. Cl. .............. 369/284; 369/283; 369/286; 369/275.2; 346/135.1; 346/76 L; 430/945
[58] Field of Search .............. 369/280, 282, 283, 284, 369/286, 288, 275.2, 275.4; 346/135.1

[56] References Cited

U.S. PATENT DOCUMENTS

| | | | |
|---|---|---|---|
| 4,398,203 | 8/1983 | Cornet | 346/135.1 |
| 4,430,659 | 2/1984 | Maffitt et al. | 346/135.1 |
| 4,527,173 | 7/1985 | Gupta et al. | 346/135.1 |
| 4,645,712 | 2/1987 | Ishigaki et al. | 428/433 |
| 4,651,172 | 3/1987 | Watanabe et al. | 346/135.1 |
| 4,673,626 | 6/1987 | Takeda et al. | 430/14 |
| 4,680,458 | 7/1987 | Drexler | 235/487 |
| 4,709,363 | 11/1987 | Dirks et al. | 369/275 |
| 4,710,452 | 12/1987 | Raychaudhuri | 430/495 |
| 4,719,615 | 2/1988 | Feyrer et al. | 369/284 |
| 4,773,059 | 9/1988 | Minemura et al. | 369/100 |
| 4,774,615 | 9/1988 | Revelli et al. | 369/13 X |
| 4,780,867 | 10/1988 | Lind et al. | 369/100 |
| 4,798,785 | 1/1989 | Pan et al. | 430/495 |
| 4,825,430 | 4/1989 | Halter et al. | 369/286 |
| 4,837,127 | 6/1989 | Ohara et al. | 430/270 |
| 4,852,075 | 7/1989 | Feyrer et al. | 369/100 |
| 4,852,077 | 7/1989 | Clark et al. | 369/284 |
| 4,896,314 | 1/1990 | Skiens et al. | 369/284 |
| 4,918,682 | 4/1990 | Finegan | 369/275 |

FOREIGN PATENT DOCUMENTS 1229410 11/1987 Canada.
0263641 4/1988 European Pat. Off. .

OTHER PUBLICATIONS

Watkinson (1988), "The Compact Disc", Chapter 13 in *The Art of Digital Audio*, Focal Press, Boston.
Marchant (1990), *Optical Recording: A Technical Overview*, Addison-Wesley, Menlo Park, Calif.

*Primary Examiner*—Stuart S. Levy
*Assistant Examiner*—Kenneth B. Wells
*Attorney, Agent, or Firm*—Townsend and Townsend

[57] ABSTRACT

An optical storage medium is disclosed. In a preferred embodiment a substrate is provided with an expansion layer. A retention layer is provided opposite the substrate. A liquid reflective layer is provided adjacent the retention layer, either adjacent to or opposite the expansion layer. The reflective layer is enclosed by a protective layer. Improved expansion and retention layers are also disclosed.

35 Claims, 9 Drawing Sheets

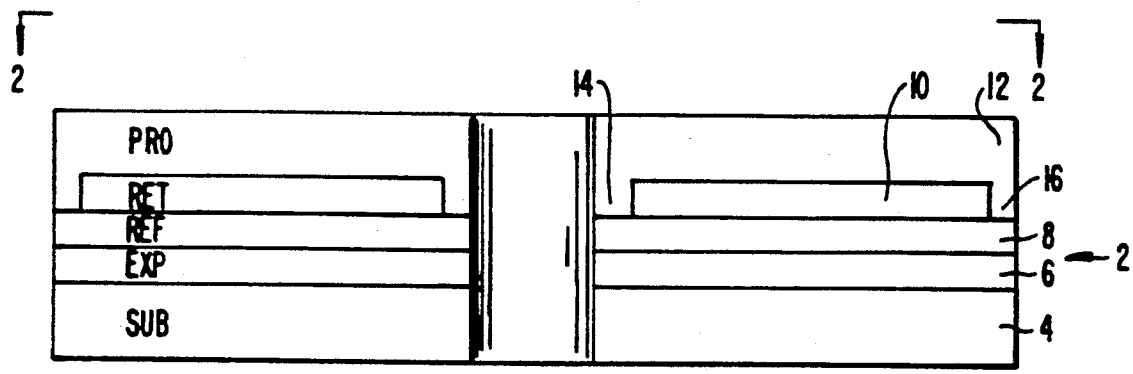
FIG._1.
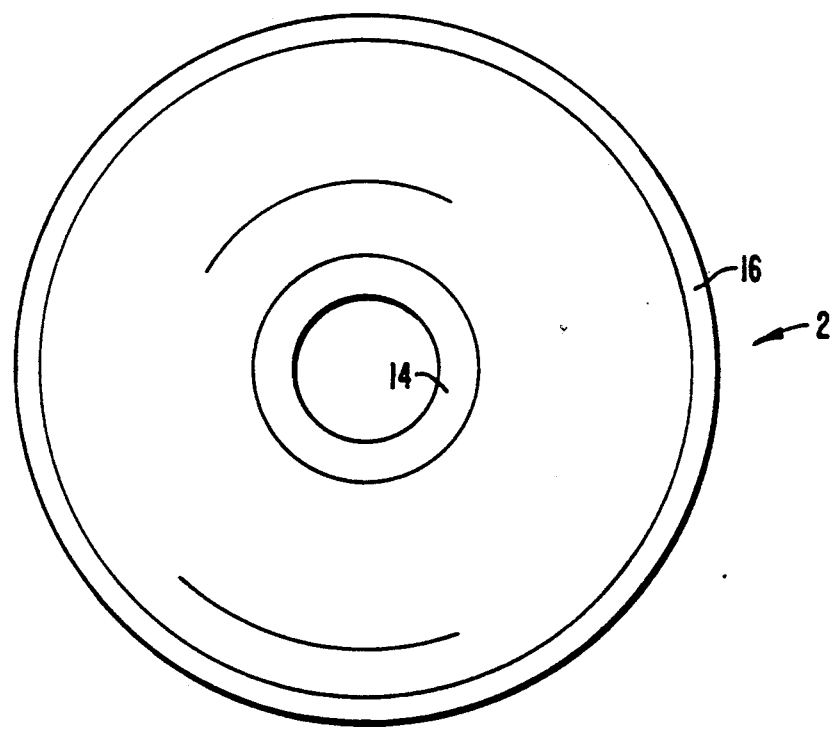
FIG._2.

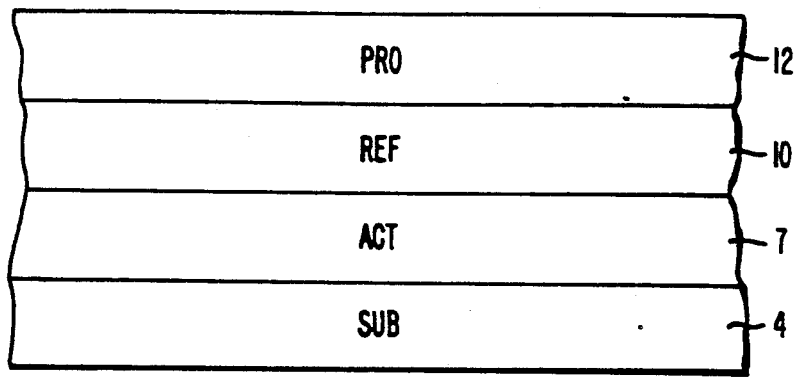
FIG._3.
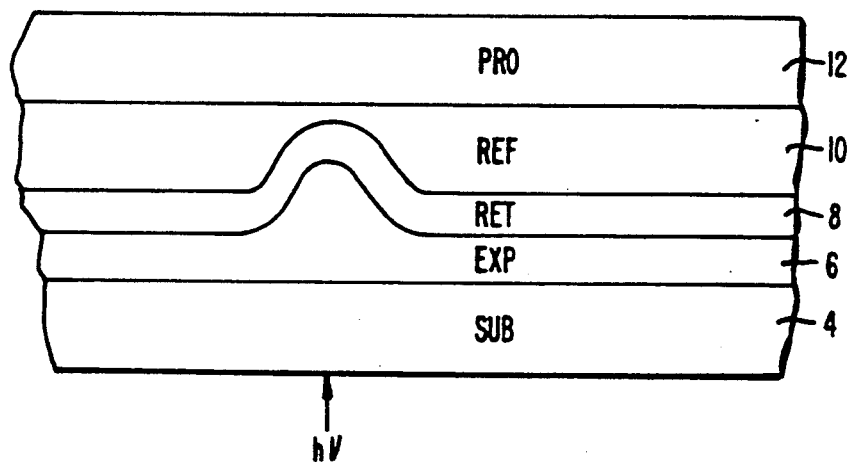
FIG._4A.
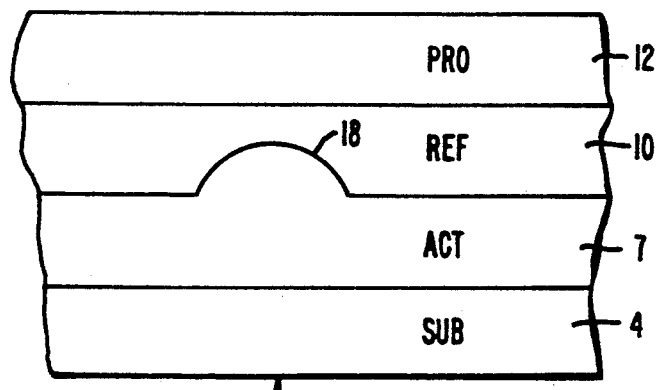
FIG._4B.

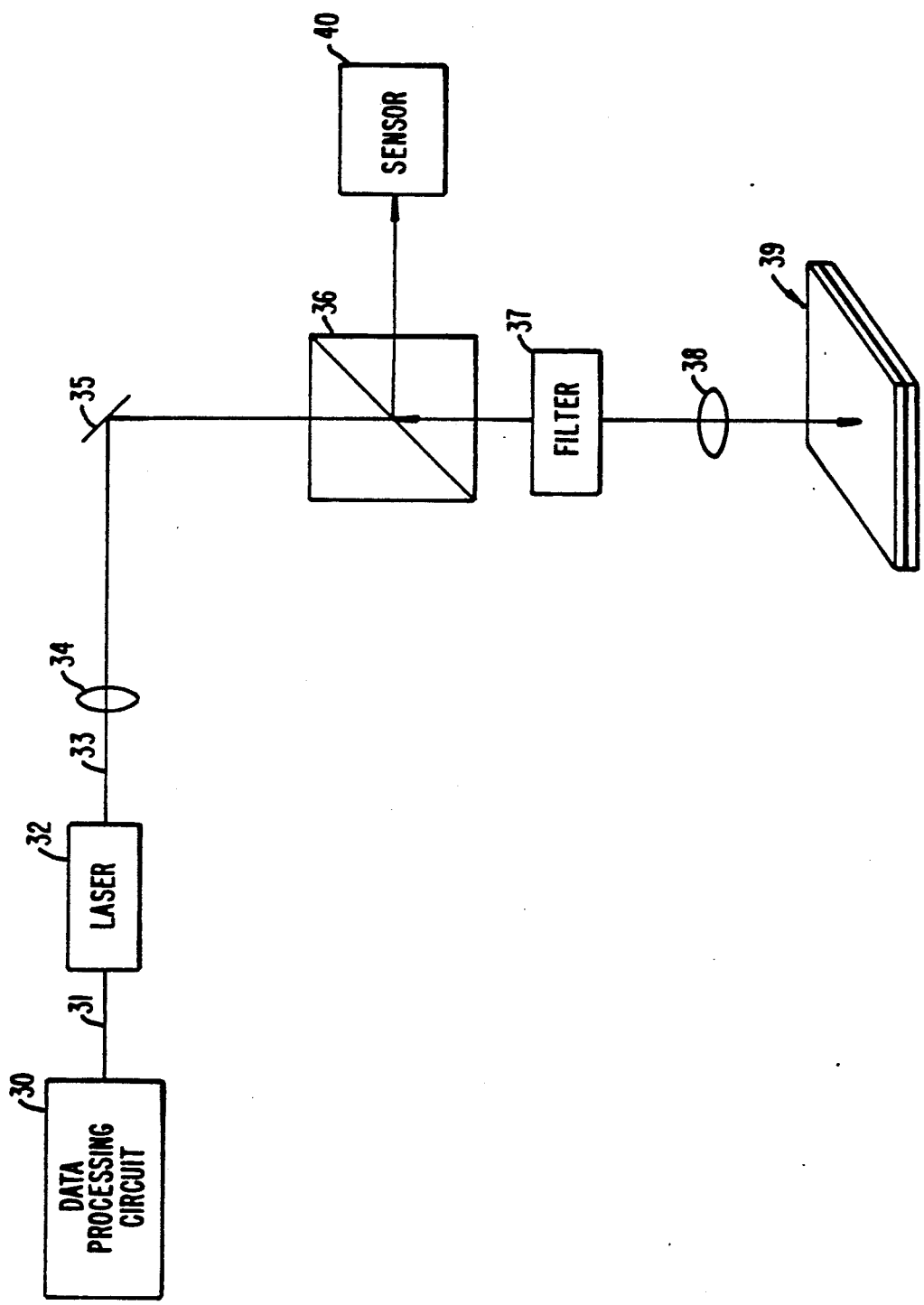
FIG.—5.

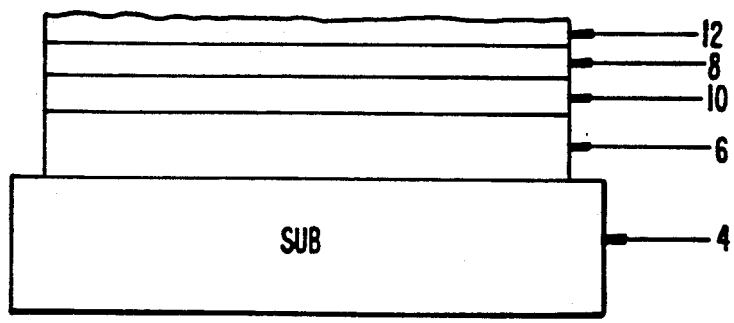
FIG._6.
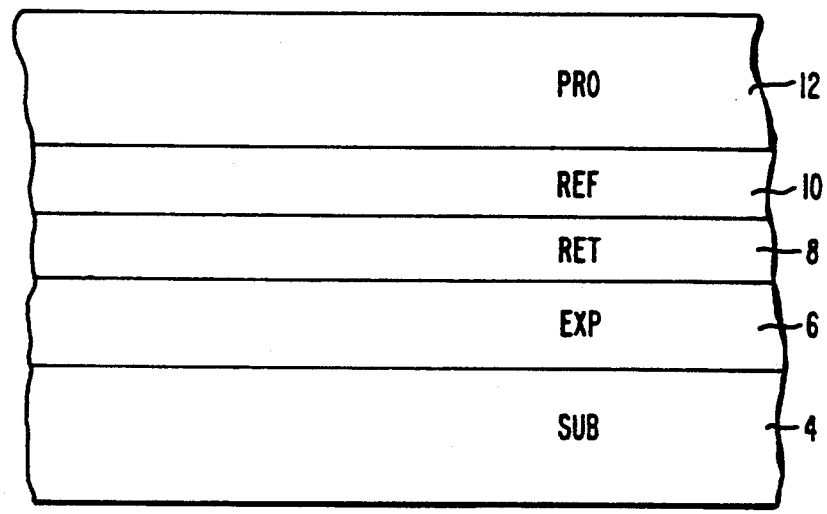
FIG._7.
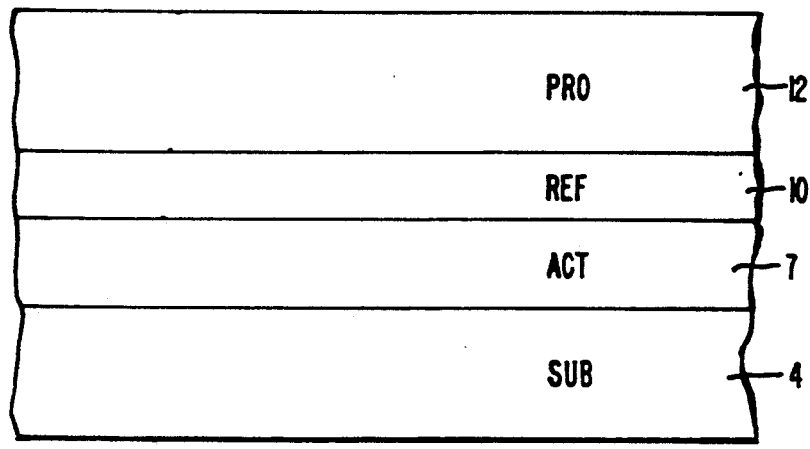
FIG._8.

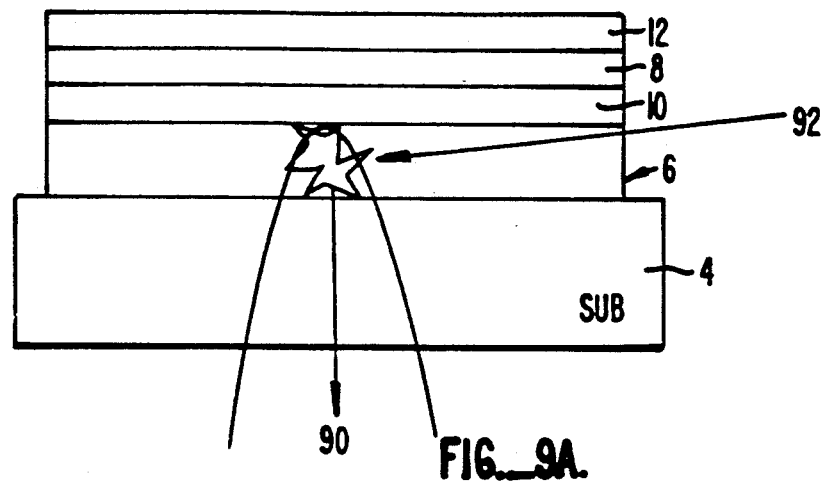
FIG._9A.
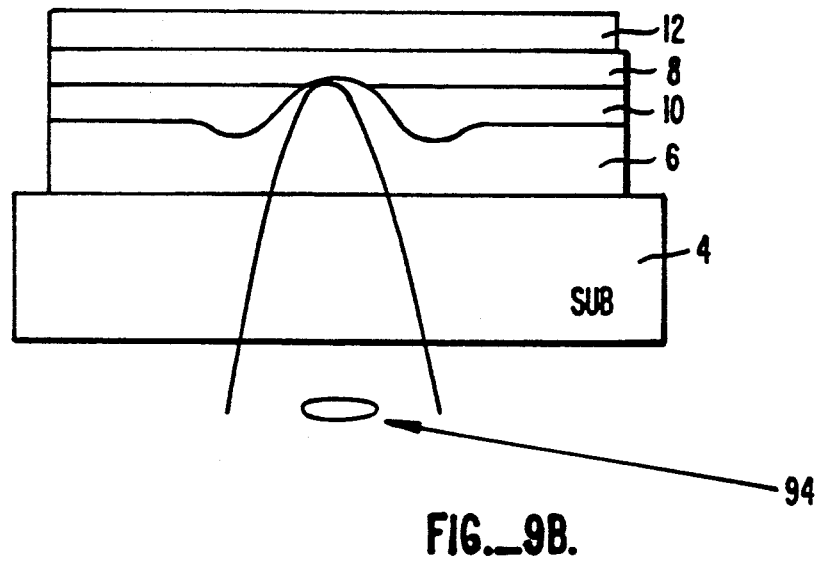
FIG._9B.
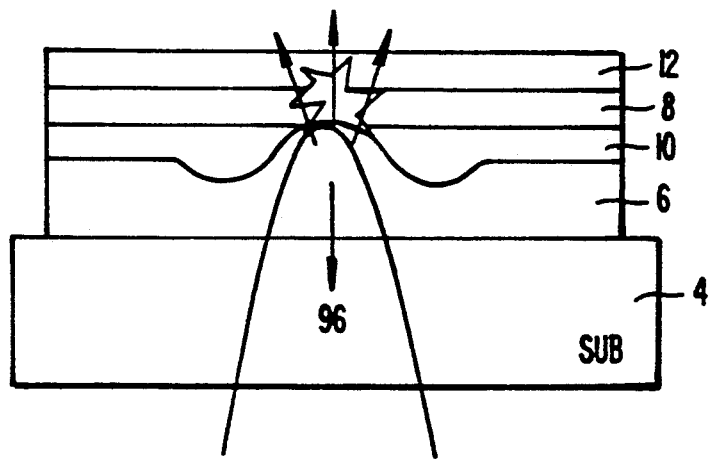
FIG._9C.

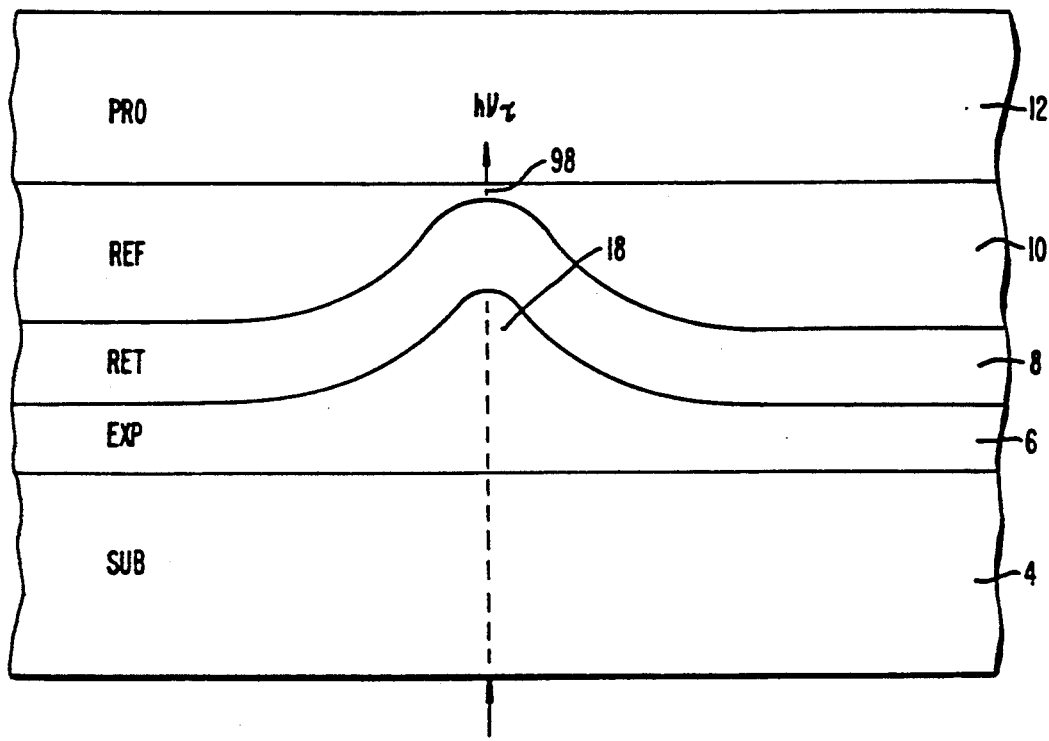
FIG.—10.
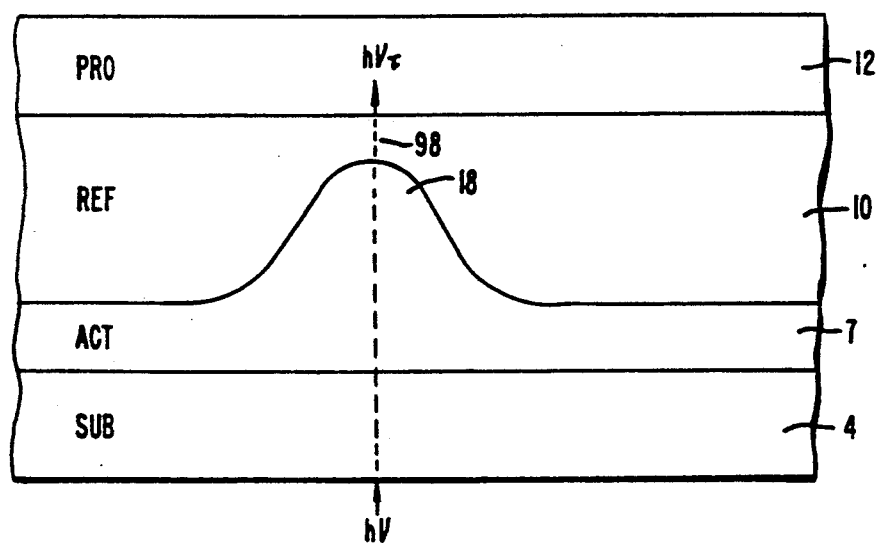
FIG.—11.

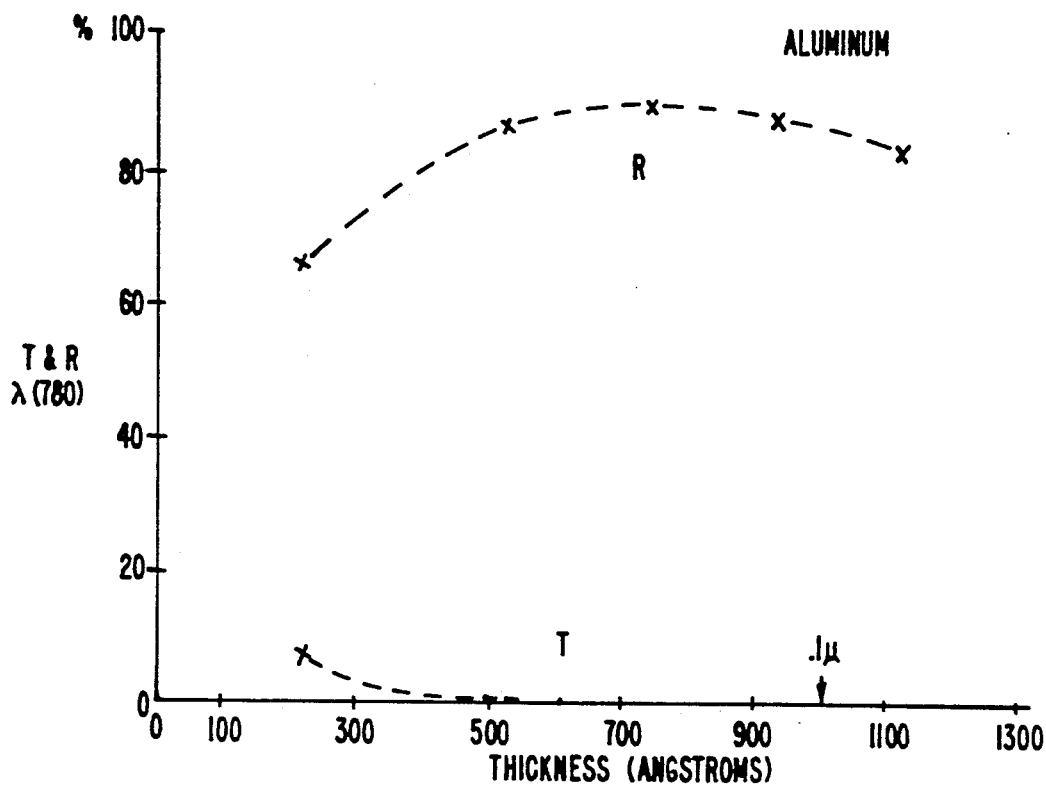
FIG._12A.
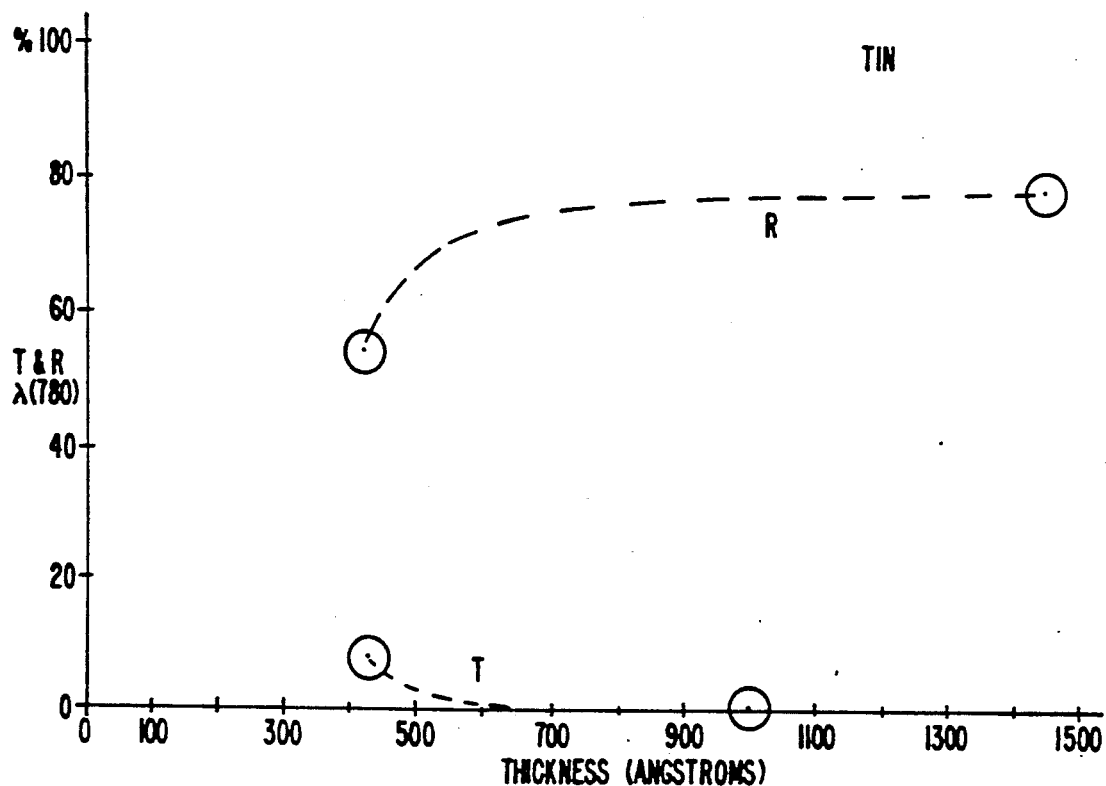
FIG._12C.

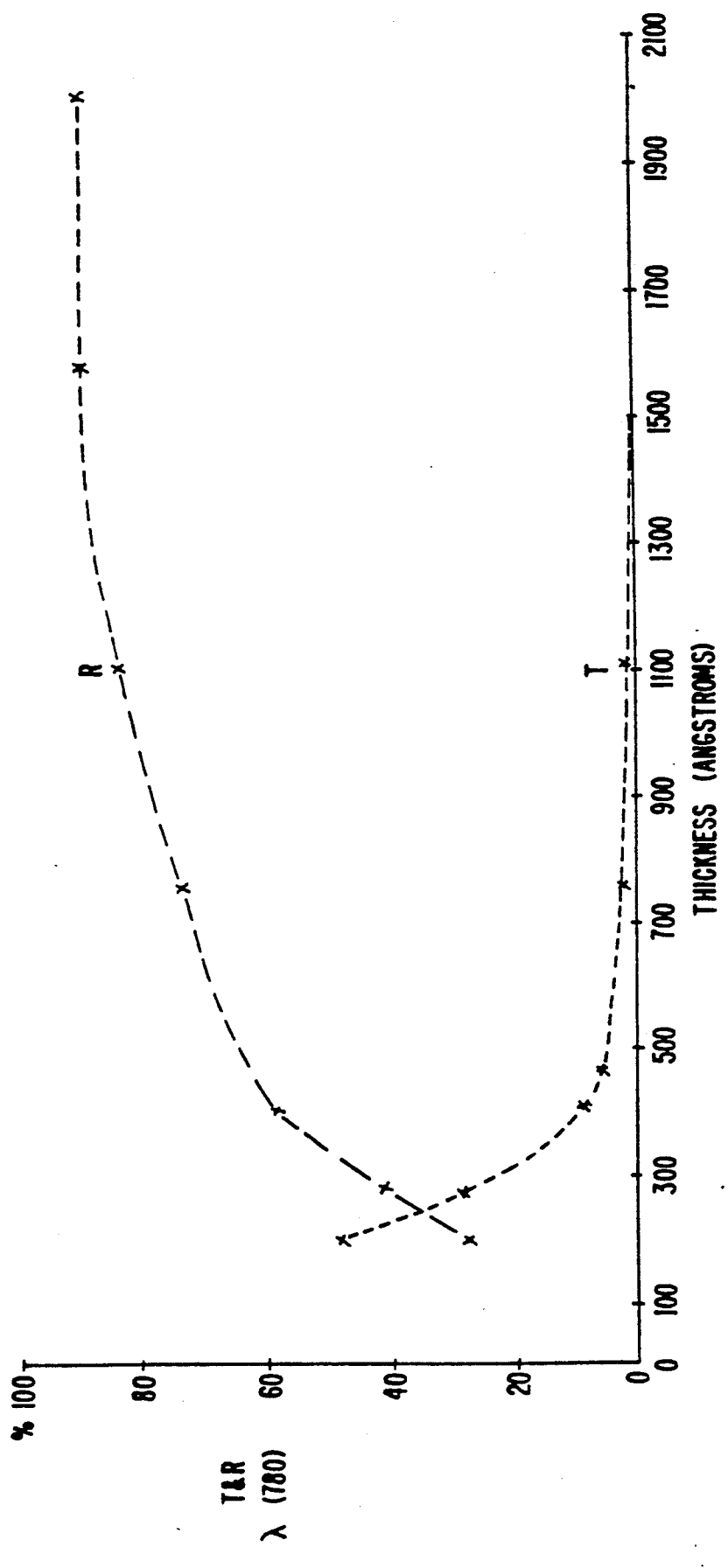

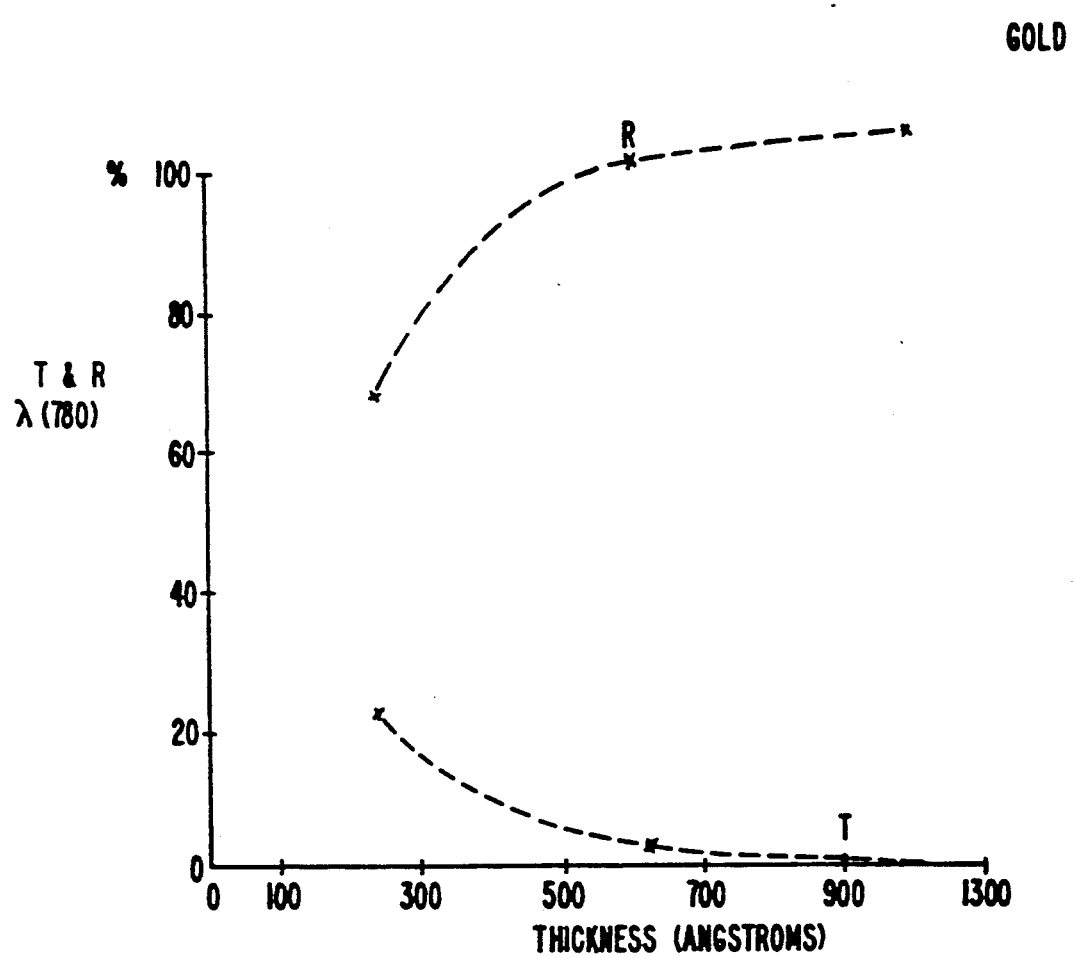
FIG._12D.

ERASABLE RECORDING MEDIA

CROSS-REFERENCE TO RELATED APPLICATIONS

This application is a continuation-in-part of U.S. Application Ser. No. 07/357,377, filed May 25, 1989, now abandoned which is a continuation-in-part of U.S. Application Ser. No. 07/294,723, filed Jan. 10, 1989, which is a continuation-in-part of U.S. Application Ser. No. 07/153,288, filed Feb. 5, 1988 now abandoned. This application is also a continuation-in-part of U.S. Application Ser. Nos. 07/414,041 and 07/414,044, both filed Sept. 28, 1989. The above applications are each incorporated herein by reference for all purposes.

BACKGROUND OF THE INVENTION

This invention relates in general to the field of recording media. In particular, one embodiment of this invention provides an erasable optical storage media and write/read/erase mechanism therefor in which data may be recorded and, in some embodiments, erased in response to thermal effects and, in particular in response to light.

Optical data storage media in the form of compact disks are well known as an alternative to longplaying records and magnetic tape cassettes. The disks with which consumers are familiar are optical read-only disks and the common disk player is designed specifically for this type of disk. These disks have a reflective surface containing pits which represent data in binary form. A description of these pits and how they function is provided by Watkinson, "The Art of Digital Audio," Focal Press, Chapter 13.

The pits increase the optical path of the laser beam by an amount equivalent to a half wavelength, thereby producing destructive interference when combined with other (non-shifted) reflected beams. The presence of data thus takes the form of a drop in intensity of the reflected light. The detection system on a standard player is thus designed to require greater than 70% reflection when no destructive interference occurs and a modulation amplitude greater than 30% when data is present. These intensity limits, combined with the focusing parameters, set the criteria for the compact disks and other optical data storage media which can be read or played on such players.

Copending application Ser. No. 294,723 (assigned to the assignee of the present application) describes an improved optical recording method and apparatus. In one embodiment, the invention includes an expansion layer, a reflective layer, and a retention layer. As the expansion layer is heated it expands, pressing into the thin reflective layer and optionally, into, the retention layer which is typically covered by a protective layer. In an alternative embodiment the retention layer is provided between the reflective and expansion layers. In any event the retention layer is pressed into, for example, the protective layer which is sufficiently compliant to allow deformations. The reflective layer is described as, for example, gallium, aluminum, copper, silver, gold, and indium.

While meeting with substantial success, the optical media described above have one or more limitations. For example, two lasers are necessary in some embodiments, each producing separate individual wavelengths: a "recording laser" emitting a beam with a wavelength corresponding to the absorption frequency of a dye in the expansion layer and an "erasing laser" emitting a beam with a wavelength corresponding to the absorption frequency of a dye in the retention layer. Second, manufacture of these media requires several separate coating operations, thereby increasing the risk of defects due to coating flaws, dust and handling, for example. Also, the manufacturing cost is increased with each additional coating operation.

Furthermore, the above optical recording methods and media require that the reflective layer be able to withstand repeated flexures and/or that the adhesion between polymeric layers such as the retention layer be sufficient so as to avoid separation at the interface between the two layers. Further, significant amounts of energy are required to create bumps in a solid or malleable protective layer.

From the above it is seen that an improved optical recording medium and improved methods of writing and erasing data thereon are desired.

SUMMARY OF THE INVENTION

An optical recording method and apparatus are disclosed. In one embodiment, a layer of soft material, typically above its melting point or a sub-cooled liquid, is provided adjacent a retention or expansion layer in an optical recording media. The soft layer is, in a first embodiment, preferably relatively thick in comparison to bumps that are formed on the expansion layer or which displace volume in the soft layer. Therefore, soft material displaced by the bumps is accommodated by increased pressure over a large area in, for example, a protective layer. Accordingly, bumps may be more easily formed since they encounter less resistance to formation. Further, the soft region is better able to withstand repeated flexures and assures that separation from the expansion layer is limited.

According to the first embodiments, the invention includes a substrate; an expansion region, typically adjacent the substrate, the expansion region which expands in the presence of radiation at a write wavelength; and means for receiving a volume induced by expansion from the expansion region, the means for receiving comprising a very soft material, a liquid, or a vapor at an operating temperature of the recording medium. The means for receiving is preferably a liquid metal.

A method of recording data on a media is also disclosed. In the first embodiment the method includes the steps of: directing light at a media, the media comprising an expansion region, the expansion region expanding in response to the light; receiving an expanded volume from the expansion region in a liquid or vapor layer; and retaining the expansion region in an expanded state. Retention may be accomplished by a separate retention layer on either side of the soft layer, or by incorporating retention properties into the expansion layer, thereby forming a single active, or expansion/retention, layer.

In the second embodiments, the invention includes a substrate; an expansion region, typically adjacent the substrate, the expansion region expanding in the presence of radiation at a write wavelength; and means for receiving a volume induced by expansion from the expansion region, the means for receiving comprising a soft material, a liquid or a vapor at an operating temperature of the recording medium. However, in contrast to the previously described first embodiments, the layer of reflective material, typically a soft metal above its melting point or a sub-cooled liquid, is relatively thin in comparison to the height of bumps that are formed from the expansion region. This embodiment is based, in part, upon the observation that the reflective properties of extremely thin films are very dependent upon layer thickness. Very thin films have a much lower reflectivity than thicker films. In one particular embodiment, the bumps fully traverse through the soft material. Retention may result from a separate retention layer on one or the other side of the soft material, or by incorporating retention properties into the expansion layer, thereby forming a single active, or expansion/retention, layer. Methods of recording and of erasing data on such media are also provided.

In the third embodiments, the invention typically comprises a substrate; an expansion region, typically adjacent the substrate, said expansion region expanding in the presence of radiation at a write wavelength; and means for receiving a volume induced by expansion from the expansion region, the means for receiving comprising a reflective material, preferably a soft material, a liquid or a vapor at an operating temperature of the recording medium. However, in contrast to the previously described first and second embodiments, the layer of reflective material is comparable in thickness to the height of bumps that are formed from the expansion region. This embodiment is based, in part, upon the observation, as described herein, that the reflective properties of extremely thin films are highly sensitive to layer thickness. Very thin layers have a much lower reflectivity than thick layers. In one particular embodiment, the bumps nearly, but do not fully traverse the material, preferably a fluid, and the thinness of the layer substantially changes its reflective properties relative to the rest of the layer. The retention function typically results either from a separate retention layer, by incorporating retention properties into the expansion layer, thereby forming a single active, or expansion/retention, layer or by incorporating retention properties into the reflective layer, thereby forming a single reflective/retention layer.

Improved optical recording media materials are also disclosed. In one embodiment the media includes an expansion layer, the expansion layer expanding in response to application of light of at least one wavelength, the expansion layer comprising a first epoxy; a retention layer, the retention layer adapted to retain the expansion layer in an expanded state, the retention layer comprising a second epoxy, the first epoxy having a glass transition temperature higher than the first epoxy. In preferred embodiments, the expansion layer has a glass transition temperature below about 50° C. and the retention layer has a glass transition temperature of about 80° to 120° C. Alternatively, the retention function may be incorporated into the expansion layer to provide a single combined expansion/retention layer, or active layer.

In alternative embodiments, the media comprise specific arrangements of layers. For example, in various embodiments, the expansion layer is adjacent the substrate layer; sandwiched between the expansion layer and a retention layer is a liquid or vapor "fluid" layer which serves as a reflective layer. Various other embodiments reorient the layer to sandwich a retention layer between an expansion layer and the soft solid, liquid or vapor layer, which serves as a reflective layer. Various other embodiments rearrange the layers providing a sandwich of a retention layer between an expansion layer and the soft, liquid or vapor layer, or combine the expansion and retention functions in a single active layer, typically a homogenous layer.

BRIEF DESCRIPTION OF THE DRAWINGS

FIG. 1 is a cross-section of a recording media illustrating one embodiment of the invention. This version has separate expansion and retention layers in the orientation: (substrate)-expansion-retention-reflective-(protective) where those layers within parentheses are optional.

FIG. 2 is a top view of the media illustrated in FIG. 1.

FIG. 3 illustrates an alternative embodiment of the invention. This version has a single active layer, where the active layer has combined properties of the expansion and retention layers, in the orientation: (substrate)-active-reflective-(protective).

FIGS. 4A and 4B illustrate recorded bumps in various embodiments. FIG. 4A illustrates a portion of the substrate in FIG. 1 with a recorded "bump." FIG. 4B illustrates a portion of the substrate in FIG. 3 with a recorded "bump."

FIG. 5 illustrates an electro-optic system for recording, erasing, and reading the media herein.

FIG. 6 illustrates an embodiment of an optical medium having a very thin reflective layer. This version has separate expansion and retention layers on opposite sides of the reflective layer, in the orientation: (substrate)-expansion-reflective-retention-(protective).

FIG. 7 illustrates an alternative embodiment having a very thin soft reflective layer. This version has separate expansion and retention layers, both on one side of the reflective layer, in the orientation: (substrate)-expansion-retention-reflective-(protective).

FIG. 8 illustrates one embodiment having a very thin soft reflective layer. This version has a single active layer, where the active layer has combined properties of the expansion and retention layers, in the orientation: (substrate)-active-reflective-(protective).

FIGS. 9A through 9C illustrate the processes of writing, reading and erasing on an optical media illustrated in FIG. 6.

FIG. 10 illustrates one particular embodiment having a thin reflective layer and a data bump formed thereon. This version has separate expansion and retention layers on the same side of the reflective layer, in the orientation: (substrate)-expansion-retention-reflective-(protective).

FIG. 11 illustrates one particular embodiment having a thin reflective layer and a data bump formed thereon. This version has a single active layer, where the active layer has combined properties of the expansion and retention layers, in the orientation: (substrate)-active-reflective(protective).

FIGS. 12A through 12D illustrate the relationship between reflectivity or transmission of 780 nm light versus thickness of thin layers of various metals. The indicated metals were deposited onto polycarbonate disks by thermal evaporation at low pressures, less than about $1 \times 10^{-5}$ mm Hg. Reflectivity and transmission of 780 nm light for the following materials were measured:
A. Aluminum
B. Indium
C. Tin
D. Gold.

DETAILED DESCRIPTION OF THE PREFERRED EMBODIMENTS

Contents

A. First Embodiments (Thick, Soft Reflective Layer)
  1. Media
  2. Operation
  3. Recording System
B. Second Embodiments (Thin, Soft Reflective Layer)
  1. Media
  2. Operation
C. Third Embodiments (Modulation of Read Beam Through Variation in Thickness of Reflective Layer)
  1. Media
  2. Operation
D. Conclusion

A. First Embodiments

The first embodiments described are characterized by a soft, liquid or vapor reflective layer which is relatively thick in comparison to the heights of data bumps which are formed by the expansion region.

1. Media

FIGS. 1 and 2 illustrate one embodiment of an optical recording medium or disk 2 in cross-section and top view respectively. The disk includes a substrate 4 onto which an expansion layer 6 is provided. A retention layer 8 is provided adjacent the expansion layer and opposite the substrate.

A reflective layer 10 is provided adjacent the retention layer and opposite the expansion layer. The reflective layer in one embodiment of the invention is a reflective material which is above its melting point or boiling point at an operating temperature of interest, i.e., at an expected operating temperature of the disk. In most embodiments the operating temperature of the disk will be about room temperature, i.e., about 20° C.±5° C. Alternatively, the reflective layer may be a soft solid or a sub-cooled liquid at the operating temperature of the disk. The reflective layer, further, reflects greater than about 25% of the light incident thereon at a wavelength of write, read, and erase beams to be used in conjunction with the media. Examples of useable soft materials, include aluminum, indium, tin, gold, bismuth, mercury, gallium, cesium, rubidium, and alloys of gallium and indium such as those manufactured by Indalloy Corp., and mixtures of the above materials. Other materials may include, for example, amalgams of Hg which may include Na, Li, Mg, K, Ca, Sc, Rb, Sr, Y, Cs, Ba, La, and/or Zn. In a preferred embodiment the reflective layer is an alloy of gallium and indium. In some embodiments, the alloy contains from about 0 to 30% indium, 70 to 100% gallium and 0 to 20% tin. In most preferred embodiments the reflective layer comprises about 5 to 25% indium, 75 to 95% gallium, and 0 to 20% tin.

The reflective layer 10, according to one first embodiment, is of sufficient thickness such that data bumps formed in the retention layer are contained completely or nearly completely in the reflective layer. Data bumps recorded on optical disks would typically fall in the range from 0.06 μm to 1.5 μm high. Accordingly, in a preferred embodiment the reflective layer is between about 0.5 and 1.5 μm thick. In a most preferred embodiment the reflective layer is about 1.0 μm thick.

In alternative embodiments the soft or liquid layer is reflective because it has an index of refraction sufficiently different from the retention layer such that a significant fraction of a beam incident thereon is reflected. For example, differences in the index of refraction of about 5% or more will be sufficient in some embodiments. The term "reflective layer" is intended to also encompass this embodiment.

Above the reflective layer and enclosing the material therein is a protective layer 12. In order to contain the reflective layer, the protective layer is provided with an inner ring 14 and an outer ring 16 which extends to and contacts the retention layer 8. In a preferred embodiment the width of the rings 14 and 16 is between about 1 mm and 4 mm. The thickness of the inner and outer rings is selected in accordance with the desired thickness of the reflective layer 10.

It will be readily apparent to those of skill in the art that while the invention has been described with reference to the use of protective material 12 to form rings 14 and 16, as illustrated in FIGS. 1 and 2, a wide variety of arrangements could be utilized. For example, the retention layer 8 could be provided with rings extending upwardly therefrom so as to contact the protective layer. Alternatively, another material such as epoxy could be used to form the rings 14 and 16 between the protective and retention layers. In preferred embodiments, the liquid layer is deposited on the retention layer and the protective layer is, thereafter, deposited on the liquid layer.

The substrate and the protective layer may be constructed from a wide variety of readily available materials. Typically, the substrate 4 is formed from a rigid transparent material that permits substantially full transmission of light for recordation, reading, and erasure. The substrate is sufficiently thick and rigid to provide structural integrity to the optical medium, such that it does not deform in response to pressure caused by expansive forces in the adjacent layer. Recordation bumps in the expansion layer, caused by its thermal expansion upon absorption of the write beam's light energy, protrude away from the substrate because of its rigidity. With this layer arrangement, the bumps protrude into the reflective layer, if present, as described below.

The substrate may be constructed from a wide variety of readily available materials. Merely by way of example, the substrate could be fabricated from glass, polymers, and amorphous polymers. In a preferred embodiment the substrate is made of polycarbonate, which has the desired property of transmitting light. In most embodiments the substrate will be the thickest layer with a thickness of about 1 mm or more.

The expansion layer is usually formed of a material which (a) absorbs a percentage of light energy passing through it; (b) displays a high coefficient of thermal expansion, particularly when compared to the other layers of the medium; and (c) displays a high coefficient of elasticity to the extent that it will expand readily when heated at the temperatures encountered during a recordation process without exceeding its upper expansion limit. The expansion layer should also normally contract to its original flat condition upon cooling. When at room temperature, the expansion layer material should be near or above its glass transition temperature, which is preferably below 30° C. or 50° C. Coefficients of thermal expansion above about $1 \times 10^{-4}/°$ C. are preferred, with those greater than about $5 \times 10^{-4}/°$ C. more preferred, and those greater than about $7.5 \times 10^{-4}/°$ C. particularly preferred. The degree of absorptivity of light energy could be between 20% and 40% in the wavelength range from about 850 nm to 650 nm such that the expansion layer may be heated with a write beam. Suitable dyes for incorporation into this layer include nigrosin blue, aniline blue, Calico Oil blue, ultramarine blue, methylene blue chloride, savinal blue, Monastral Blue, Macrolex Green Ozalate, Sudan Black BM, Tricon Blue, Macrolex green G, DDCI-4 and IR26. To maintain the ability to read data recorded on the optical media on standard detection mechanisms, such as those found on conventional compact disk players, a maximum double pass absorption at the standard compact disk read wavelength (780 nm) of 10% is most preferred. Accordingly, the expansion layer may be selected from epoxies, polyurethane, polymers, amorphous polymers, rubber, natural rubber, butyl rubber, silicone rubber, styrenebutadiene rubber, cellulose acetate, cellulose acetatebutyrate, polystyrene, polysulfonamide, polycarbonate, cellulose nitrate, poly(ethylmethacrylate), poly(vinyl butyryl), aromatic polyesters, polyamides, acrylic polymers, polyvinyl acetate, silicone resins, alkyd resins, polyvinyl acetate, styrene-butadiene copolymers, vinyl chloride-vinyl acetate copolymers, nitrocellulose, ethylcellulose, and mixtures thereof. In a preferred embodiment the expansion layer is an epoxy resin with a glass transition below 50° C. and a Young's modulus of at least about 40,000 pounds per square inch (psi). In one embodiment, the expansion layer is about 1 micron or less thick.

The retention layer is usually formed of a material that (a) absorbs a percentage of light energy passing through it; (b) displays a glass transition temperature which is above room temperature and preferably about that of the expansion layer; (c) is rubbery, when above its glass transition temperature, with sufficient elasticity to permit it to conform to the contour of the distortion formed in the second layer by the expansion of the first layer, when the expansion layer is heated; and (d) displays sufficient rigidity and strength below its glass transition temperature such that it will hold the expansion layer in an expanded condition, even though the first layer is cooled to ambient temperature. In preferred embodiments, the retention layer 8 is formed of material or combinations of materials which display at least some light absorption at the wavelength of an erase beam. The wavelength of the erase beam may be chosen from a wide spectrum of available light wavelengths. The degree of absorptivity may vary from wavelength to wavelength and from retention material to retention material but may be for example about 30% to 45% at wavelengths between about 650 nm and 860 nm. Suitable dyes for incorporation into this layer include those dyes described for an expansion layer.

Accordingly, the retention layer may be made from one or more of the following materials: epoxies, urethanes, polymers, amorphous polymers, rubber, natural rubber, butyl rubber, silicone rubber, styrene-butadiene rubber, cellulose acetate, cellulose acetate-butyrate, polystyrene, polysulfonamide, polycarbonate, cellulose nitrate, poly(ethyl-methacrylate), poly(vinyl butyryl), aromatic polyesters, polyamides, acrylic polymers, polyvinyl acetate, silicone resins, alkyd resins, polyvinyl acetate, styrene-butadiene copolymers, vinyl chloride-vinyl acetate copolymers, nitrocellulose, ethylcellulose, and mixtures thereof. In a preferred embodiment the retention layer is an epoxy with a glass transition temperature of about 80° to 120° C. and may be, for example, about 105° C. The thickness of the retention layer is approximately 0.5 to 1.5 microns in one embodiment. The retention layer will typically have a Young's modulus of at least about 400,000 psi. In a preferred embodiment, the thickness of the retention layer is between about 0.5 and 1.0 microns.

To fabricate the expansion layer, base resins are mixed with appropriate curing agents. In particular, in one embodiment Shell 828 and 871 are mixed in approximately equal amounts with a non-stoichiometric (e.g., 2.6×) amount of a curing agent such as versamid V150. To fabricate the retention layer, Shell 828 and Dow DEH52 are mixed in approximately equal amounts with a nonstoichiometric (e.g., 1.5×) amount of a curing agent.

FIG. 3 illustrates an alternative embodiment. Adjacent to the substrate is a single polymer layer, termed the "active" region or layer, which alleviates the need for separate expansion and retention layers. The mechanism by which this layer functions is a result of a thermal gradient created within the active layer, as well as of the viscoelastic properties of the material of the layer. As described below, both recording and erasure thus can be accomplished with a single laser beam. Additionally, there is necessarily one less separate coating operation involved in the manufacture of a medium of this embodiment of the present invention.

The active layer is comprised of a polymer whose softening temperature is above room temperature (20° C.) and which has a relatively large coefficient of expansion above its softening temperature. By "softening temperature" is meant the temperature at which the modulus of elasticity of the material of the active layer has dropped to 25% to 50% of its room temperature or maximum modulus. A softening temperature will be at least about 30° C., preferably at least about 90° C. and less than about 175° C., preferably less than about 130° C. The coefficient of expansion should be greater than about $200 \times 10^{-6}/°$ C., preferably greater than about $250 \times 10^{-6}/°$ C., and more preferably greater than about $300 \times 10^{-6}/°$ C.

The active layer material may comprise a base resin selected from the group consisting of epoxys, polyurethane, polymers, amorphous polymers, cellulose acetate, cellulose acetate-butyrate, polystyrene, polysulfonamide, polycarbonate, cellulose nitrate, poly(ethylmethacrylate), poly(vinyl butyryl), aromatic polyesters, polyamides, acrylic polymers, polyvinyl acetate, silicone resins, alkyd resins, styrene-butadiene copolymers, vinyl chloride-vinyl acetate copolymers, nitrocellulose, ethylcellulose, and mixtures thereof. In a preferred embodiment, the active layer is an epoxy with a softening temperature of about 80° C. to 120° C. and may be, for example, about 105° C.

In more preferred embodiments, a base resin or mixture of resins may be mixed with appropriate curing agents to form the active layer or region. In particular, a bisphenol A/-epichlorohydrin epoxy resin (Shell 828, manufactured by Shell Chemical) and an epichlorohydrin-dimer fatty acid-based epoxy resin (Shell 871, manufactured by Shell Chemical) may be mixed in approximately equal amounts with a nonstoichiometric (e.g., 2.6×) amount of a curing agent, such as Versamid V150 (a polyamide resin which is an adduct of a polyamine with a dibasic fatty acid, manufactured by Henkel). Additionally, Shell 828 may be mixed with a nonstoichiometric (e.g., 1.5×) amount of a curing agent such as Dow DEH52 (an aliphatic polyamine-epoxy adduct, manufactured by Dow Chemical).

The thickness of the active layer is typically at least about 0.5 μm, preferably at least about 1.0 μm; and less than about 3.0 μm, preferably less than about 2.0 μm. The active layer is typically bonded to the substrate and the reflective layer, if the latter is present. This is achieved by methods known in the art. For example, coating of the active layer onto the substrate may be accomplished by a wet chemical process, such as spin coating or web coating. The reflective layer is then deposited onto the active layer. The reflective layer deposition process will depend on what material is chosen for the layer. For example, a die layer would use a wet chemical process such as spin coating. A metal layer would use vacuum deposition or sputtering. Other types of polymers may use plasma deposition. All of these coating processes are known in the art. Certain techniques are described in greater detail in Marchant, *Optical Recording: A Technical Overview* (1990), Addison-Wesley, Menlo Park, Calif., which is entirely incorporated by reference herein for all purposes.

2. Operation

FIG. 4A illustrates one embodiment of the invention during and after the writing of a data "bump" 18. As shown, a write beam (indicated by hν) enters the substrate 4 and passes into the expansion layer 6, which absorbs significant amounts of energy at the wavelength of the write beam. Accordingly, the expansion layer is heated and expands into the retention layer 8.

A significant portion of the light is passed into the retention layer 8, which is also heated and softened, thereby accommodating the expansion layer more easily. The data bump 18 expands into the reflective layer 10. In one embodiment, the expansion layer absorbs light at a first "write" wavelength (e.g., 680 nm) while the retention layer absorbs light at a second "erase" wavelength (e.g., 830 nm). The write beam includes both wavelengths in one embodiment, heating both layers simultaneously for writing a data bump. Conversely, for erasing, only the erase wavelength is applied to the media, thereby heating, softening, and releasing the expansion layer which contracts to its original flat condition. In an alternative embodiment, the retention layer does not absorb a significant amount of the write beam and is heated only by conduction from the expansion layer. In a preferred embodiment the expansion layer is loaded with savinal blue (from Mobay) and the retention layer is loaded with savinal blue and tricon blue or DDCI-4.

For a single active layer media, the data bump is formed when the layer is heated sufficiently to both soften and expand, as described in more detail below.

In the alternative embodiment illustrated in FIG. 4B, a reflective layer 10 is adjacent to the active layer. This reflective layer serves to reflect light back through the active layer 7 for purposes of recordation and data detection. In one embodiment of the invention, this layer is highly reflective, preferably reflecting at least about 70% of the light striking it during both recordation and reading. As shown, the volume of liquid in the reflective layer is comparatively large compared to the volume of liquid displaced by the data bump. Accordingly, the data bump 18 is accommodated by a small increase in pressure in the soft material, liquid or vapor filled region and may also cause a corresponding slight deformation of the surface of the protective layer 12. Conversely, when the data bump is erased, the pressure in the liquid-filled region decreases very slightly and the protective layer returns to its original position.

FIG. 4B illustrates this particular version of the invention during/after the writing (either during the initial recording or during subsequent recordings) of recordation bump 18. To write, a laser beam (indicated by "hν") enters the substrate 4 and passes into the active layer 7 where it is absorbed at a particular wavelength, known as the "write" wavelength. The absorptive characteristics of the layer may be imparted thereto using methods that will be apparent to those of skill in the art, such as by the addition of light-absorptive dyes or pigments. Since the medium of the present invention need not be wavelength specific, a broad range of dyes or pigments is available for this purpose. In addition, except for the ability to pass a portion of the wavelength energy which is employed for the purpose of reading the recorded data, these dyes or pigments need not be wavelength-specific and may therefore absorb light energy over a broad spectrum of wavelengths. Thus, during recordation the laser beam is absorbed by a dye or a pigment contained within the active layer which will absorb light from the laser beam at the write wavelength to cause the active layer to expand away from the substrate and form recordation bump 16 extending into the reflective layer. Dyes or pigments that can be used singly or in combination are nigrosin blue, aniline blue, Calco Oil Blue, ultramarine blue, methylene blue chloride, savinal blue, Monastral Blue, Malachite Green Ozalate, Sudan Black BM, Tricon blue, Macrolex green G, DDCI-4, and IR26. Preferred among these are savinal blue, Tricon blue, Macrolex green G, and DDCI-4.

Because the absorption of the beam by the dye or pigment occurs progressively throughout the complete thickness of the active layer, a thermal gradient is created within the layer. This gradient depends on the amount of energy that is absorbed at a given depth within the layer. The incident surface of the active layer is necessarily heated to a higher temperature than its opposite surface, which results in a progressive absorption through the layer, and a thermal gradient is formed between the two surfaces.

The heated spot of the polymer active layer is confined by a surrounding low temperature area, and expansion can take place only away from the substrate. If a reflective layer 10 is present, it will act as a passive component so that when a recordation bump 18 is formed, the bump will protrude into the reflective layer and the reflective layer will conform around the bump. In addition to improving reflection, the metal reflective layer acts as a heat sink during recordation and causes the active layer to cool more rapidly at its opposite surface. If the reflective layer has a low reflectance, a recordation bump will form, and the recording can be played back on a player designed to detect the deformation of the active layer without the high reflectance created by the reflective layer.

Whether or not a reflective layer is present, when the laser beam is turned off, the opposite surface of the active layer will cool much more rapidly than the incident surface, resulting in a temperature below the softening temperature of the polymer for the opposite surface. The opposite surface thus becomes rigid and locks the recordation bump into place while the hotter incident surface area is still expanded.

Additionally, formation of the recordation bumps is enhanced due to the viscoelastic forces within the polymer material of the active layer. During the record process, the material of the active layer heats to extremely high temperature quite rapidly. This allows expansion forces to cause a bump to form. When the laser beam is turned off, the material cools rapidly due to the fact that it is surrounded by a cooler area of material. The resulting thermal conduction away from the heated area occurs more rapidly than the viscoelastic restoring forces of the material, and this contributes to locking the recordation bump into place.

After the optical medium has been recorded, as described above, erasure can be achieved. For example, this may be accomplished by "spot" erasure, where either a different laser with a larger focused point, or the same laser used to record on the medium but defocused to a slightly larger spot, is used to focus a light beam through the substrate 4 and the active layer 7. Erasure occurs when a recorded area of the active layer is heated relatively slowly to the softening temperature of the active layer and is then cooled slowly so that the active layer relaxes to its original unwritten state. By heating the active layer slowly, a steep temperature gradient is not formed through the thickness of the layer such as was formed during recordation. The cooling rate of the active layer is now slower than its viscoelastic restoring forces so that the polymeric material of the layer returns to its original spatial arrangement.

Unlike much of the prior art, there is no reason which requires that the write or recordation wavelength be different from the erasure wavelength. The write wavelength chosen can, and is preferred to be the same wavelength as used for erasure. The previous need for two lasers, to record and to erase, with different wavelengths corresponding to the absorption frequencies of different dyes in separate expansion and retention layers, is eliminated by the present invention.

Reading of the recorded data (bumps) from the optical disk is achieved by focusing a light beam, chosen from a wide spectrum of available light wavelengths, through the substrate 4 and through the active layer 7. Where a highly reflective layer 10 is present, that is, a layer with a reflectance of 70% or greater at the read wavelength, reading can be accomplished by a standard compact disk player read mechanism, with the recordation bumps generating interference with, or allowing transmission of, the read light beam and the interference then being detected by the read or playback system. If a reflective layer is not present or if the reflective layer has a low reflectance, the recording can be played back on a player designed to detect the deformation of the active layer without the high reflectance created by the reflective layer.

In the erasure step for either of the versions described, the dual expansion plus retention layer version, or the single active layer version, the soft, liquid or vapor-filled reflective layer is able to immediately fill the void left by the data bump when it contracts and, accordingly, separation of the layers is not a problem. Further, the use of a liquid reflective layer as described above will permit formation of data bumps with less energy, typically about 15% less, than would be required if the data bumps are forced into a harder layer below its melting point. This is an important advantage provided by the present invention.

A protective layer 12 may be present which serves to protect the recordation bumps from damage due to contact with external objects. Typically this layer is sufficiently compliant to allow the deformations or bumps in the expansion region or the active layer to easily protrude into it and thereby offer little resistance to their formation. In addition, the protective layer preferably is relatively thick when compared to the expansion region and reflective layer, or the active and reflective layers, so that the bumps are not transmitted through the reflective layer, into the protective layer and subsequently through the protective layer to its outer surface. Suitable materials for use as a protective layer include silicone and acrylate.

A protective layer may or may not be required depending on the functionality, storage, and/or handling of the optical disk. Thus, in an application where the disk is stored and operated in a protective case or cartridge, a protective layer may not be required. A protective layer may also not be required where the reflective layer is of sufficient thickness so that the recordation bumps are not transmitted through the reflective layer to its outer surface.

3. Recording System

FIG. 5 illustrates one example of an electro-optical system for recording data on a data storage medium in accordance with various embodiments of the present invention. The recording system includes a digital data processing circuit 30 whose output on line 31 controls the pulsed variable-intensity laser 32. The laser beam 33 emerging from the laser 32 is collimated by a lens 34 and then reflected by a mirror 35. The reflected beam from the mirror is propagated through a beam splitter 36.

The laser beam emerging from the beam splitter 36 is passed through a filter 37, which may be a quarter-wavelength plate, and then propagated through an objective lens 38 which focuses the laser beams on the moving optical data storage medium 39. Light reflected back from the medium 39 is collected by the lens 38 and propagated through the filter 39 to the beam splitter 36, which propagates the reflected light to a light sensor 40.

The laser 32 is preferably a high-power laser (2-15 mW at the media surface) and is either continuous or pulsed. The wavelength of the laser beam 33 is the wavelength referred to above as the "write" or "record" wavelength, and is either continuous, shaped, or pulsed. The write beam typically enters the medium at the substrate side, as shown in FIG. 4A, and passes through the transparent substrate 4 into the expansion layer 6. The expansion layer, which is absorptive of light at the laser wavelength, rises in temperature due to the absorption, but is kept from localized expansion by the rigid substrate 4 and retention layer 8 (which is in its glassy state). Expansion pressure thus builds up and the retention layer begins to deform in a broad manner. Meanwhile, the temperature of the retention layer rises by conduction from the expansion layer, and possibly by light absorption as well (as described above). As the temperature of the retention layer increases, it approaches the glass transition temperature and a small weak area is formed around the axis of the incident beam. The expansion layer then flows into this weak area allowing expansion to be localized and thereby creating a well-defined bulge or bump 18. The retention layer 8 deforms accordingly to follow the contour of the bulge, and protrude into the soft, liquid or vapor reflective layer 10. When the laser is turned off, the various layers cool. The reflective layer 10 acts as a heat sink rapidly drawing heat away from the retention layer 8, and the retention layer 8 cools down below its glass transition temperature, increasing its shear modulus to lock in the deformation while the expansion layer 6 is still in its expanded state. An analogous process occurs when a single active layer is used.

Erasure is achieved by using a laser beam of a different wavelength, one which is absorbed primarily by the retention layer 8. The expansion layer 6 may also be absorptive at this wavelength, to some degree, provided that the resulting temperature increase in the expansion layer is not great enough to record a mark. Absorption of the light from this beam by the retention layer will raise it to its rubbery state, at which point elastic forces in the expansion layer as well as the viscoelastic properties in the retention layer will draw the retention layer back to the configuration shown in FIG. 1. Reflective layer 10 will naturally flow back into the void left by the retention layer.

B. Second Embodiments (thin, soft reflective layer)

In a second class of embodiments, the soft, liquid or vapor layers, usually reflective, of the optical medium are made very thin, in one embodiment, rearranged as shown in FIG. 6. In particular, the reflective layer is sufficiently thin that the expansion region bumps optimally traverse the reflective layer. This allows for an embodiment where the relative positions of the retention and reflective layers are reversed relative to those depicted in FIG. 3. This provides, in some embodiments, for a single wavelength medium, wherein a single wavelength of light is used for all of the write, read and erase functions. The medium includes, in one embodiment as illustrated in FIG. 6, an expansion layer 6 sandwiched between a substrate layer 4 and a reflective layer 10. Opposite from the expansion layer 6 and adjacent to the reflective layer 10 is a retention layer 8. Typically, a protective layer 12 encloses some or all of the other layers, although a sufficiently thick retention layer may provide a protective function. An alternative embodiment is illustrated in FIG. 7, where both the expansion and retention layers are on the same side of the reflective layer. Although similar to an embodiment illustrated in FIG. 1, the reflective layer is thinner, described below in reference to the embodiment of FIG. 6.

1. Media

The substrate and protective layers may be constructed from a wide variety of readily available materials such as those described in accordance with the first embodiment. For instance, the substrate could be fabricated from glass, polymers, amorphous polymers, and in a preferred embodiment, polycarbonate. Typically, the substrate will be the thickest layer, about 1 mm or more. Similarly, the expansion layer is formed of the same materials as those described in conjunction with the first embodiment.

The reflective layer in one embodiment of the invention is a reflective material which is very soft, typically a metal above its melting point or boiling point at an operating temperature of interest, i.e., at an expected operating temperature of the disk. In most embodiments the operating temperature of the disk will be about room temperature, i.e., about 20° C.±5° C. Alternatively, the reflective layer may be a sub-cooled liquid at the operating temperature of the disk. The reflective layer, further, reflects greater than about 25% of the light incident thereon at a wavelength of write, read, and erase beams to be used in conjunction with the media. Examples of useable materials include aluminum, indium, tin, gold, bismuth, mercury, gallium, cesium, rubidium, and alloys of gallium and indium such as those manufactured by Indalloy Corp., and mixtures of the above materials. Other materials may include, for example, amalgams of Hg which may include Na, Li, Mg, K, Ca, Sc, Rb, Sr, Y, Cs, Ba, La, and/or Zn. In a preferred embodiment the reflective layer is an alloy of gallium and indium. In some embodiments, the alloy contains from about 0 to 30% indium, 70 to 100% gallium and 0 to 20% tin. In most preferred embodiments the reflective layer comprises about 5 to 25% indium, 75 to 95% gallium, and 0 to 20% tin.

The reflective layer 10 should usually be of a thickness such that data bumps formed in the retention layer typically completely or nearly completely traverse the reflective layer depending upon how the retention function is performed. If a separate retention layer is opposite the reflective layer from the expansion layer, the bumps should traverse the reflective layer; but if the retention function occurs from a different arrangement, it may not be necessary that the data bumps completely traverse the reflective layer. Data bumps recorded on optical disks would typically fall in the range from 0.06 $\mu$m to 1.5 $\mu$m high, although according to this second embodiment, the data bump size is less critical and the data bump sizes may be larger or smaller. Accordingly, the reflective layer is usually at least about 0.2 $\mu$m and preferably at least about 0.5 $\mu$m thick; and less than about 1.5 $\mu$m, preferably less than about 1.0 $\mu$m thick; with a more preferred thickness of about 1.0 $\mu$m.

In alternative embodiments the soft, liquid or vapor layer has an index of refraction sufficiently different from the retention layer such that a significant fraction of a slightly off from normal beam incident thereon is reflected. For example, differences in the index of refraction of about 5% or more will be sufficient in some embodiments. The term "reflective layer" is intended to also encompass these embodiments.

Typically, absorption properties are imparted to the expansion and retention layers, if separate, by incorporation of appropriate dyes or pigments including, but not limited to the use of, singly or in combination, nigrosin blue, aniline blue, Calco Oil Blue, ultramarine blue, methylene blue chloride, Monastral Blue, Malachite Green Oxalate, Sudan Black BM, Tricon blue, Macrolex green G, DDCI-4, and IR26. The relative absorption coefficients between these two layers, the expansion and retention layers, will be selected to match the heat capacities and other characteristics of the respective layers. The relative absorptions of the expansion and retention layers may be at least about 0.75:1, and preferably about 1:1. In a preferred embodiment the expansion layer is loaded with about 3% savinal blue GCS, and the retention layer is loaded with about the same amount of the same dye.

In one embodiment the retention layer is used to both seal the liquid metal reflective layer, and is applied in a layer sufficiently thick to further function as a protective layer.

In an alternative embodiment as illustrated in FIG. 8, adjacent to the substrate is a single polymer layer, termed the "active" region or layer, which alleviates the need for separate expansion and retention layers. As with the prior embodiment, the reflective layer is sufficiently thin that data bumps fully traverse the reflective layer. Both recording and erasure thus can be accomplished with a single laser beam. Additionally, there is necessarily one less separate coating operation involved in the manufacture of a medium of this embodiment of the present invention. These combined advantages provide for economical production of both the apparatus for using these media and for higher efficiency production of the media.

The active layer is comprised of any polymer whose softening temperature is above room temperature (20°

C.) and which has a relatively large coefficient of expansion above its softening temperature and may be selected from the various materials described in conjunction with the first embodiments.

2. Operation

FIGS. 9A through 9C illustrate one of the second preferred embodiments, described in FIG. 6, having separate expansion and retention layers, during and after the writing of a data "bump." Although provided for illustration purposes, the following description is not meant as a limitation as to the means or processes involved in use of the medium. As shown in FIG. 9A, a write beam enters the substrate 4 and passes into the expansion layer 6 and reflects back from the reflective layer 10 for a second passage through the expansion layer 6. In its dual passage through the expansion layer, the incorporated dyes or pigments absorb significant amounts of energy 92 at the wavelength of the write beam. Accordingly, as illustrated in FIG. 9B, the expansion layer is heated and expands as a "bump," penetrating the reflective layer and contacting the retention layer 8. The retention layer is then heated both by the light beam, absorbed by the appropriately incorporated dyes or pigments, and from thermal conduction from the expansion layer bump. This heating of the retention layer permits the bump from the expansion layer to intrude into this layer. The retention layer then cools faster than and adheres to the expansion layer bump before it can contract, thereby "locking" the bump to the retention layer. By use of a single wavelength of light, the appropriate dyes or pigments may be the same for both the expansion and retention layers, or in the combined active layer.

The reflective layer will typically be extremely soft, or preferably a flowing liquid or vapor exhibiting sufficiently low viscosity as to flow readily when increased temperatures or pressures are applied. Increased temperatures will result from the increased light energy absorbed from the write wavelength beam. Increased pressures will arise from the pressure of the bump formed in the expansion layer. The penetration of the reflective layer by the bump from the expansion layer results in a displacement of the reflective material making up the reflective layer, creating an aperture. Thus, when a read beam is directed at the aperture, the beam is not reflected but passes through the aperture into the retention layer. This transmitted read beam passes into the retention layer to be absorbed, thus causing reflection of light off the reflective layer to drop off to virtually zero at the corresponding position 94 on the medium.

The read wavelength of light may even be selected to be the same as the write and erase beams, thereby allowing a single light source. Typically, the read beam will be about 10% of the write beam intensity. Because the read beam is of lower energy than the write or erase beams, the retention layer is not substantially heated during a read process.

FIG. 9C illustrates the process of erasing the information on this type of medium. The energy absorption properties of the retention layer are used to heat the material. However, an erase step typically uses a pulsed light beam, possibly a defocussed write beam, preferably the same wavelength and approximately the same energy as in a write step. The retention layer becomes heated by the direct transmission of light through the aperture into the reflective layer. As indicated above, the relative amounts of dyes or pigments, and thereby the amounts of absorption of light in the expansion and retention layers, may be adjusted such that the retention layer will heat more quickly, and the expansion layer will retract away from the retention layer in the pulsed erase beam, and contract back to its original position 96. According to preferred embodiments, the degree of absorptivity of the retention layer at the combined write/erase beam wavelength is between about 20% and 80% less than the absorptivity of the expansion layer with a preferred embodiment of between about 50% and 70%, and a most preferred embodiment of about 60% less than that of the expansion layer. The reflective layer also will return to its original position, thereby separating the expansion and retention layers and serving to again reflect light in the manner of unused medium.

The media shown in in FIGS. 7 and 8 will operate essentially as described in the corresponding first embodiments except that data bumps in these embodiments will fully traverse the reflective layer.

A recording system as described in the first embodiments may be used to read, write and erase the optical media provided in the second embodiments. Of course, an alternative apparatus which monitors transmission rather than reflection may be used with these media. The sensor and read beam source may actually be located on opposite sides of the plane of the media.

C. Third Embodiments (Modulation of read beam through variations in thickness of reflective layer)

In the third embodiments of the present invention, the optical medium takes advantage of differential properties of a layer dependent upon layer thickness. Although typically reflective properties are of interest, as described in the first and second embodiments, a differential index of refraction may provide similar functionality. The description below is specifically directed towards examples of reflection.

With very thin layers of various metals, preferably soft metals, transmission and reflection properties are highly dependent upon layer thickness. For example, with a layer with zero thickness, i.e., a non-existent layer, there should be no reflectivity. However, with a very thin film or layer less than about 200 Å to about 1300 Å, depending upon the metal, the reflectivity is greater than zero but substantially less than a thick layer. Some, or perhaps most, of the loss in reflectance is due to transmission through the thin layer. Thus, in these ranges of layer thickness, the reflectivity is strikingly sensitive to the layer thickness. With use of layers in this thickness range, expansion bumps can modulate reflectivity. Index of refraction effects might display similar dependence on layer thickness.

These particular embodiments take advantage of particularly soft and thin reflective layers. Formation of data bumps will penetrate into the soft reflective layer causing the reflective layer above the bump to become sufficiently thin at those locations that the reflectivity drops off sharply. Typically, this decrease in reflectance results, in part, from transmission of light through the layer. Usually, at least 5% of the incident light should be transmitted, preferably at least about 10%, more preferably at least about 20%, and most preferably at least about 30%. The minimum height of data bumps which cause the reflective layer to become thin and the reflectivity to drop off may be unusually small. Thus, sufficient expansion in the expansion region may be achieved with a wider variety of materials, or may be achieved with lower power write beams.

It will also be recognized that in circumstances where transmission of light through a reflective layer occurs, particular embodiments where the write beam impinges from the opposite direction will be available.

1. Media

In these embodiments, the layers are typically arranged as in FIGS. 10 or 11. For example, in the specific embodiment illustrated in FIG. 10, a reflective layer 10 is provided adjacent the retention layer 8 and opposite the expansion layer 6. The reflective layer may be made of a wide variety of materials, but a reflective material which is soft, or is above its melting point or boiling point at an operating temperature of interest, e.g., at an expected operating temperature of the disk, is preferred. In most embodiments the operating temperature of the disk will be about room temperature, i.e., about 20° C.±5° C. Alternatively, the reflective layer may be a sub-cooled liquid or soft material at the operating temperature of the disk. The reflective layer (at its nominal thickness), further, reflects greater than about 25% of the light incident thereon at a wavelength of write, read, and erase beams to be used in conjunction with the media. Examples of useable materials include aluminum, indium, tin, gold or alloys thereof, bismuth/indium alloys, mercury, gallium, cesium, rubidium, and alloys of gallium and indium such as those manufactured by Indalloy Corp., and mixtures of the above materials. Other materials may include, for example, amalgams of Hg which may include Na, Li, Mg, K, Ca, Sc, Rb, Sr, Y, Cs, Ba, La, and/or Zn. In a preferred embodiment the reflective layer is aluminum, indium, tin, gold or alloys thereof. In some embodiments, the alloy contains from about 0 to 30% indium, 70 to 100% gallium and 0 to 20% tin. In most preferred embodiments the reflective layer comprises a eutectic mixture of gallium and indium (75% Ga, 25% In). The expansion layer 6 and retention layer 8 are formed of materials selected from those set forth in conjunction with the first and second embodiments.

The reflective layer 10, according to the third embodiments, is preferably of a thickness such that data bumps formed in the retention layer have heights comparable to the thickness of the reflective layer. Data bumps recorded on optical disks typically fall in the range from 0.06 μm to 1.5 μm deep. Accordingly, in a preferred embodiment the reflective layer is between about 1 and 6 μm thick. In a most preferred embodiment the reflective layer is about 2 μm thick.

More important than the thickness of the reflective layer itself is the thickness of the residual reflective layer above a data bump. Thus, the thickness of that residual reflective layer 98 above data bumps using many common soft metals for reflective material should be less than about 700 Å, preferably less than about 500 Å and more preferably less than about 300 Å. While the residual layer thickness will show modulated reflectivity within these ranges, the objective is to lower reflectivity by an appropriate amount. Usually a decrease of at least about 10% in reflectivity is desired, at least about 20% is preferred, at least about 30% reaches the present commercial standards for optical disks with a more preferred decrease of at least 40%. In many cases, the loss in reflectivity indicated here is due to transmission through the thin layer, and the decrease in reflectivity is substantially due to transmission through the thin layer.

It will also be recognized that with the use of liquid or vapor reflective layers, the residual thickness of the layer above a data bump may be greater and still provide the needed decrease in reflectivity.

The embodiment illustrated in FIG. 11 operates in a similar manner to that described for FIG. 10 except that the combined functions of expansion and retention are performed by an active layer 7. The active layer 7 will be made using materials similar to those set forth in the first and second embodiments.

FIG. 12 shows traces of the relationship between reflectivity and layer thickness or between transmission and layer thickness, where the layer thickness is in the range from about 100 Å to about 1800 Å, for the metals aluminum, indium, tin and gold, respectively. The plots of FIGS. 12A, B, C and D are derived from the data presented in Tables 1, 2, 3 and 4 for the various metals at one selected wavelength. The reflectivity of the layers is quite sensitive to layer thickness, especially if the thickness of the reflective layer is varied from greater than about 500 to 700 Å to less than about 500 to 700 Å above a data bump.

TABLE 1A

ALUMINUM

| Sample No. | Optical Profile Avg. (Å) | Thickness Monitor (Å) | Thickness by weight (Å) | 780 % T | 780 % R | 830 % T | 830 % R | 680 % T | 680 % R |
|---|---|---|---|---|---|---|---|---|---|
| D | 222 | 0.060 | 200 | 8.3 | 66.7 | 8.6 | 67.1 | 8.3 | 69.1 |
| C | 518 | 0.12 | 400 | 0.3 | 86.3 | 0.5 | 85.2 | 0.3 | 89.6 |
| F | 1135 | 0.39 | 1400 | 0.0 | 81.6 | 0.0 | 81.8 | 0.0 | 83.51 |
| A | 934 | 0.30 | 1000 | 0.0 | 83.8 | 0.0 | 83.2 | 0.0 | 87.5 |
| B | 756 | 0.24 | 800 | 0.0 | 84.7 | 0.0 | 84.2 | 0.0 | 88.6 |

TABLE 1B

ALUMINUM

| RATE Å/S Actual | Sample No. | Optical Profile Avg. (Å) | Thickness Monitor (Å) | Thickness by weight (Å) | 780 % R | Noise RMS, MV. | Reflectivity DC Signals, Volts |
|---|---|---|---|---|---|---|---|
| 74 | D | 222 | 0.060 | 200 | 66.7 | 10.0 | 1.0 |
| 43 | C | 518 | 0.12 | 400 | 86.3 | 10.0 | 1.3 |
| 43 | F | 1135 | 0.39 | 1400 | 81.6 | 10.0 | 1.3 |
| 56 | A | 734 | 0.30 | 1000 | 83.8 | 10.0 | 1.3 |
| 47 | B | 756 | 0.24 | 800 | 84.9 | 10.0 | 1.3 |

TABLE 2A

INDIUM

| Sample No. | Optical Profile Avg. (Å) | Thickness Monitor (Å) | Thickness by weight (Å) | 780 % T | 780 % R | 830 % T | 830 % R | 680 % T | 680 % R |
|---|---|---|---|---|---|---|---|---|---|
| 2-C | 207 | 0.104 | 130 | 44.4 | 23.4 | 48.5 | 22.5 | 35.4 | 25.4 |
| 2-B | 285 | 0.202 | 260 | 24.6 | 40.8 | 26.5 | 38.9 | 18.1 | 43.0 |
| 2-D | 408 | 0.307 | 390 | 9.6 | 59.3 | 10.9 | 57.9 | 6.9 | 61.8 |
| 3-A | 468 | 0.414 | 530 | 6.3 | 66.6 | 7.1 | 65.7 | 4.7 | 67.7 |
| 3-B | 758 | 0.620 | 790 | 2.6 | 72.8 | 2.8 | 72.3 | 2.2 | 73.3 |
| 3-C | 1003 | 0.819 | 1050 | 2.1 | 78.0 | 2.2 | 77.6 | 1.9 | 78.1 |
| 3-F | 1575 | 1.565 | 2000 | 0.0 | 89.5 | 0.0 | 89.2 | 0.0 | 89.8 |
| 3-E | 2054 | 2.010 | 2570 | 0.0 | 87.2 | 0.0 | 88.8 | 0.0 | 89.5 |

TABLE 2B

INDIUM

| RATE Å/S Actual | Sample No. | Optical Profile Avg. (Å) | Thickness Monitor (Å) | Thickness by weight (Å) | 780 % R | Noise RMS. MV. | Reflectivity DC Signals, Volts |
|---|---|---|---|---|---|---|---|
| 6–12 | 2-C | 207 | 0.104 | 130 | 23.4 | 10.0 | .42 |
| 14 | 2-B | 285 | 0.202 | 260 | 40.8 | 35.0 | .65 |
| 7–10 | 2-D | 408 | 0.307 | 390 | 59.3 | 31.0 | .93 |
| 11 | 3-A | 468 | 0.414 | 530 | 66.6 | 38.0 | 1.0 |
| 12 | 3-B | 758 | 0.620 | 790 | 72.8 | 28.0 | 1.15 |
| 12 | 3-C | 1003 | 0.819 | 1050 | 78.0 | 28.0 | 1.2 |
| 10 | 3-F | 1575 | 1.565 | 2000 | 89.5 | 10.0 | 1.4 |
| 10 | 3-E | 2054 | 2.010 | 2570 | 89.2 | 10.0 | 1.4 |

TABLE 3A

TIN

| Sample No. | Optical Profile Avg. (Å) | Thickness Monitor (Å) | Thickness by weight (Å) | 780 % T | 780 % R | 830 % T | 830 % R | 680 % T | 680 % R |
|---|---|---|---|---|---|---|---|---|---|
| 0-C | 804 | 0.63 | 800 | | | | | | |
| 1-C | 1455 | 0.78 | 1000 | 0.0 | 77.5 | 0.0 | 77.4 | 0.0 | 77.8 |
| 1-D | 428 | 0.16 | 200 | 6.3 | 52.7 | 6.9 | 51.8 | 5.0 | 54.6 |

TABLE 3B

TIN

| RATE Å/S Actual | Sample No. | Optical Profile Avg. (Å) | Thickness Monitor (Å) | Thickness by weight (Å) | 780 % R | Noise RMS, MV. | Reflectivity DC Signals, Volts |
|---|---|---|---|---|---|---|---|
| 37 | 1-C | 1455 | 0.78 | 1000 | 77.5 | 10.0 | 1.2 |
| 40 | 1-D | 428 | 0.16 | 200 | 52.7 | 38.0 | .875 |

TABLE 4A

GOLD

| Sample No. | Optical Profile Avg. (Å) | Thickness Monitor (Å) | Thickness by weight (Å) | 780 % T | 780 % R | 830 % T | 830 % R | 680 % T | 680 % R |
|---|---|---|---|---|---|---|---|---|---|
| F | 245 | 0.40 | 200 | 22.9 | 68.0 | 19.1 | 69.4 | 34.1 | 59.1 |
| D | 584 | 1.20 | 600 | 4.4 | 89.0 | 3.65 | 90.6 | 8.95 | 84.8 |
| C | 612 | 1.21 | 600 | 2.9 | 101.5 | 2.3 | 102.8 | 5.1 | 96.8 |
| B | 1005 | 2.00 | 1000 | 0.0 | 105.1 | 0.0 | 105.6 | 0.2 | 103.0 |

TABLE 4B

GOLD

| RATE Å/S Actual | Sample No. | Optical Profile Avg. (Å) | Thickness Monitor (Å) | Thickness by weight (Å) | 780 % R | Noise RMS, MV. | Reflectivity DC Signals, Volts |
|---|---|---|---|---|---|---|---|
| — | F | 245 | 0.40 | 200 | 68.0 | 14.0 | 1.2 |
| 19 | D | 584 | 1.20 | 600 | 89.0 | 17.0 | 1.5 |
| 25 | C | 612 | 1.21 | 600 | 101.5 | 10.0 | 1.58 |
| 23 | B | 1005 | 2.00 | 1000 | 105.1 | 10.0 | 1.6 |

All coatings were made on polycarbonate discs by thermal evaporation. Initial pressures were maintained at $\leq 1 \times 10^{-5}$ mm. Small tungsten open boats were used in the case of tin, gold and indium. For aluminum, a heated boron nitride crucible was used. Rates were run as high as possible (about 20 Å/sec) within practical limits. Rate monitor values were adjusted in the data table with a density ratio factor based on previous calibration with gallium.

FIG. 12A is a plot of the reflection and of the transmission of light at 780 nm against layer thickness, by optical profile, of aluminum. Reflection decreases as the layer thickness drops below about 550 Å, drops rather quickly below about 500 Å, to below 70% at about 300 Å, and quickly below about 250 Å. The amount of transmission is inversely related to the amount of decrease in reflection. Therefore, the desired metal layer thickness in the region of a data mark using an aluminum reflective layer is usually less than about 550 Å, preferably less than about 500 Å, more preferably less than about 300 Å and most preferably less than about 250 Å.

FIG. 12B is a plot of the reflection and of the transmission at 780 nm light versus layer thickness, by optical profile, of indium. Reflection decreases as the layer thickness drops below about 1100 Å, drops rather quickly below about 800 Å, to below 70% at about 600 Å, and more quickly below about 400 Å. Therefore, desired metal layer thickness in the region of a data mark with an indium reflective layer is usually less than about 1100 Å, preferably less than about 800 Å, more preferably less than about 600 Å, and most preferably less than about 400 Å.

FIG. 12C is a plot of the reflection and of the transmission of light at 780 nm against layer thickness, by optical profile, of tin. Reflection decreases as the layer thickness drops below about 1000 Å, and drops rather quickly below about 700 Åto below 70% at about 500 Å. Therefore, metal thickness in the region of a data mark using tin as a reflective layer is preferably less than about 1000 Å, more preferably less than about 700 Å, and most preferably less than about 500 Å.

FIG. 12D is a plot of the reflection and of the transmission of light at 780 nm against layer thickness, by optical profile, of gold. Reflection decreases as the layer thickness drops below about 600 Å, and drops rather quickly below about 550 Å, to below 70% at about 250 Å. Therefore, desired metal layer thickness in the region of a data mark using gold as a reflective layer is less than about 600 Å, preferably less than about 550 Å, and more preferably less than about 250 Å.

An alternative example of these embodiments possesses a combined retention/reflective layer. The functions of separate reflective and retention layers may be combined together into a single layer according to the teachings of the commonly assigned U.S. Ser. No. 07/414,044 which is hereby incorporated herein by reference.

The retention/reflective layer can comprise an elemental metal, a metal alloy or other reflective material that is soft but not liquid at room temperature, and softens or melts, or both, to be deformable near or below the temperature reached by the expansion layer during recordation. Thus, the material will have a low melting point temperature, generally within the range of about 80° C. to about 200° C. In a preferred embodiment, it is also highly reflective. Metals which may be useful in the layer include bismuth, lead, tin, cadmium, indium, gallium, and alloys thereof. Pure indium yields favorable results; however, in some cases, the large grain structure of indium produces less than optimal results such as noise during playback. When indium is combined with other materials, a finer grain structure results and the noise is either reduced or eliminated. A preferred combination is indium plus bismuth, reducing the melting point form 156° C. to approximately 80° C. Also useful are alloys, particularly eutectic alloys of bismuth or indium, and more particularly a eutectic alloy of bismuth with other metals such as, for example, tin, cadmium, lead or indium. Such alloys will result in a melting point within the desired range of substantially below the softening temperature of the layer.

Because of the relationship between the thermomechanical properties of the expansion and retention/reflective layers, a critical feature for this example is the choice of materials for these two layers. The selection of metals and metal alloys with low melting points for the retention/reflective layer thus facilitates the expansion of the polymer expansion layer into the heated, softened area of the retention/reflective layer to form a recordation bump around which the retention/reflective layer conforms.

The shape of the recordation bump is retained in the metal retention/reflective layer because this layer has a comparatively high thermal conductivity that causes it to cool more rapidly than the polymer expansion layer. Thus, after the light beam is removed, the metal becomes rigid and locks the recordation bump into place while the polymer is still expanded. The use of a metal retention/reflective layer allows for a more highly defined or distinctive recordation bump.

Above the reflective layer and enclosing the material therein is usually a protective layer 12. The compositions and methods for producing the layers are similar to those described above, particularly in the first embodiments.

2. Operation

FIG. 10 illustrates one of the third embodiments of the invention during and after the writing of a data "bump" 18. As shown, a write beam (indicated by hν) enters the substrate 4 and passes into the expansion layer 6, which absorbs significant amounts of energy at the wavelength of the write beam. Accordingly, the expansion layer is heated and expands into the retention layer 8. The retention layer holds the expansion layer into an enlarged data bump upon cooling of the layers. FIG. 11 illustrates an alternative embodiment having a combined expansion and retention layer, or an active layer, which forms and retains a data bump 18. Upon formation of a data bump, if the reflective layer 10 is sufficiently soft, the reflective layer will be displaced or deformed leaving a very thin residual reflective layer 98 above the data bump. In some embodiments, in contrast to those illustrated in FIGS. 10 and 11, the protective layer is also deformed, but less so than the reflective layer. The mechanisms of bump formation are as described above, particularly in the first embodiments.

FIGS. 12A through 12D illustrate the relationship between reflectivity and layer thickness, and between transmission and layer thickness with various soft metals. Thus, when the thickness of a residual reflective layer above a data bump is sufficiently thin, typically less than about 700 Å, preferably less than about 500 Å and more preferably less than about 200 Å, the reflectivity of the residual layer is decreased substantially. This lessening of reflectivity is sufficient to satisfy current industrial standards for optical compact disk media.

The functions and responses of the expansion and retention layers, or alternatively, an active layer, are as described above in the first and second embodiments.

A reflective layer 10 may or may not be adjacent to the active layer. This reflective layer serves to reflect light back through the active layer for purposes of recordation and data detection. As shown, the volume of liquid in the reflective layer is comparatively large compared to the volume of liquid displaced by the data bump. Accordingly, the bump is accommodated by a small increase in pressure in the soft material, liquid or vapor filled region and may also cause a corresponding slight deformation of the surface of the protective layer. Conversely, when the data bump is erased, the pressure in the liquid-filled region decreases very slightly and the protective layer returns to its original position. The soft, liquid or vaporfilled reflective layer is able to immediately fill the void left by the data bump and, accordingly, separation of the layers is not a problem.

The procedures for making these media and apparatus for using the media are as described above for the first embodiments and second embodiments.

D. Conclusion

In the earlier systems, the bump typically serves to scatter the read beam, or alternatively reflects in a manner causing destructive interference. The scattering technique results in some return of light back to the detector thereby exhibiting a lowered signal to noise ratio. The destructive interference requires very close tolerances, on the order of the beam wavelength. Either process results in a requirement for close manufacturing tolerances for both the media and the read or write systems.

In the first embodiments described herein, the reflective layer is made sufficiently soft that resistance to formation of a bump in the expansion region is dramatically decreased. Thus, the range of materials useful in forming the expansion region is greatly expanded, or alternatively, the amount of expansion necessary, and the intensity of light needed, in a write operation is lessened.

The second embodiments provide a substantially thinner reflective layer across which a bump will normally traverse. This modification also allows for an embodiment where the functional layers are rearranged such that the reflective layer 10 is between the expansion layer 6 and the retention layer 8, as illustrated in FIG. 6. The aperture 94 formed in the reflective layer allows the light to pass completely through that layer, and enter the retention layer in that embodiment. The signal to noise ratio between a "bump" (reflection) and its absence (transmittance) is significantly increased and sharpened. The retention layer may possess an appropriate absorption, thereby providing substantially no read beam reflection. Since the difference between reflection and transmission is increased, the manufacturing tolerances for both the media and the read or write systems are greatly enlarged. Furthermore, since the diameter of the void in the reflective layer may be significantly smaller than the average diameter of a typical bump, the tracking tolerances may be sharpened and information density may be increased, or the manufacturing tolerances broadened.

In the third embodiments thin films provide for much wider tolerances in manufacturing and use. Thus, greater variability in the height of bumps may still provide sufficient differences in reflectivity allowing for loosening of tolerances in manufacturing of both the media and the apparatus using the media.

It is to be understood that the above description is intended to be illustrative and not restrictive. Many embodiments will be apparent to those of skill in the art upon reviewing the above description. By way of example, the invention has been illustrated with reference to a liquid reflective layer, but it will be readily apparent to those of skill in the art that a liquid or gas comprising any material could be provided adjacent the retention or expansion layer. Further, other arrangements of the various layers will be readily apparent to those of skill in the art upon review of this disclosure. The scope of the invention should, therefore, be determined not with reference to the above description, but should instead be determined with reference to the appended claims, along with the full scope of equivalents to which such claims are entitled.

What is claimed is:

1. A recording medium comprising:
   a) a substrate;
   b) an expansion region adjacent said substrate, said expansion region expanding in the presence of radiation in a write beam of light at a write wavelength to form a detectable bump thereon; and
   c) means for receiving a volume induced by expansion from said expansion region, said means for receiving comprising a liquid or vapor layer at an operating temperature of said recording medium.

2. A recording medium as recited in claim 1, wherein said expansion region comprises an expansion layer.

3. A recording medium as recited in claim 1, further comprising a retention layer, wherein said retention layer ceases to retain said detectable bump upon exposure to an erase beam of light.

4. A recording medium as recited in claim 1, comprising both an expansion layer and a retention layer.

5. A recording medium as recited in claim 1, wherein said expansion layer comprises an active layer.

6. A recording medium as recited in claim 1, wherein said means for receiving is between about 0.5 and 1.5 μm thick.

7. A recording medium as recited in claim 1, wherein said means for receiving is about 1 μm thick.

8. An optical recording medium for recording and erasing data, comprising:
   a) a substrate;
   b) an expansion layer adjacent said substrate, said expansion layer expanding upon local heating from radiation of a write beam at a write wavelength and forming a detectable bump thereon;
   c) a retention layer, said retention layer retaining said detectable bump upon cessation of said write beam, and releasing said bump upon exposure to an erase beam of an erase wavelength; and
   d) a liquid or vapor layer adjacent said retention layer, said liquid or vapor layer receiving an expanded volume from said detectable bump.

9. An optical recording medium as recited in claim 8, wherein said liquid or vapor layer is adjacent said expansion layer.

10. An optical recording medium for recording and erasing data, comprising:
    a) a substrate;
    b) an active layer adjacent said substrate, said active layer expanding upon local heating from radiation of a write beam at a write wavelength and forming a detectable bump thereon upon cessation of said write wavelength of light, and said active layer retracting to a flat state upon exposure to an erase beam of radiation at an erase wavelength; and
    c) a liquid or vapor layer.

11. An optical recording medium for recording and erasing data, comprising:
    a) a substrate;
    b) an active layer adjacent said substrate, said active layer expanding upon local heating from radiation of a write beam at a write wavelength and forming a detectable bump thereon upon cessation of said write wavelength of light, and said active layer retracting to a flat state upon exposure to an erase beam of radiation at an erase wavelength; and
    c) a liquid or vapor layer, said layer sufficiently thin that said detectable bump traverses said liquid or vapor layer.

12. A recording medium as recited in claim 11, wherein a ratio of absorbances of said erase beam by said expansion layer to said retention layer is between about 1:10 and 10:1.

13. A recording medium as recited in claim 11, wherein a ratio of absorbances of said erase beam by said expansion layer to said retention layer is between about 1:5 and 5:1.

14. A recording medium as recited in claim 11, wherein a ratio of absorbances of said erase beam by said expansion layer to said retention layer is between about 1:2 and 2:1.

15. A recording medium as recited in claim 11, wherein a ratio of absorbances of said erase beam by said expansion layer to said retention layer is about 1:1.

16. An optical recording medium as recited in claims 1, 8, 9, 10 or 11, wherein said liquid or vapor layer is reflective.

17. An optical recording medium as recited in claims 1, 8, 9, 10 or 11, wherein said liquid or vapor layer comprises a metal.

18. An optical recording medium as recited in claims 1, 8, 9, 10 or 11, wherein said liquid or vapor layer comprises a material selected from the group consisting of mercury, gallium, cesium, rubidium, bismuth, alloys of gallium, alloys of indium, alloys of bismuth and combinations thereof.

19. An optical recording medium as recited in claims 1, 8, 9, 10 or 11, wherein said liquid or vapor layer comprises about 70 to 100% gallium, about 0 to 30% indium and about 0 to 20% tin.

20. An optical recording medium for recording and erasing data, comprising:
    a) a substrate;
    b) an expansion layer adjacent said substrate, said expansion layer expanding upon local heating from radiation of a write beam at a write wavelength and forming a detectable bump thereon;
    c) a retention layer, said retention layer retaining said detectable bump upon cessation of said write beam, and releasing said bump upon exposure to an erase beam of an erase wavelength; and
    d) a soft reflective layer which deforms upon penetration of said detectable bump to become sufficiently thin above said bump to transmit at least about 10% of a read beam of light, a region around said bump being substantially more reflective of said read beam of light.

21. An optical recording medium for recording and erasing data, comprising:
    a) a substrate;

b) an active layer adjacent said substrate, said active layer expanding upon local heating from radiation of a write beam at a write wavelength and forming a detectable bump thereon upon cessation of said write wavelength of light, and said active layer retracting to a flat state upon exposure to an erase beam of radiation at an erase wavelength; and c) a soft reflective layer which deforms upon penetration of said detectable bump to become sufficiently thin above said bump to transmit at least about 10% of a read beam of light, a region around said bump being substantially more reflective of said read beam of light.

22. An optical recording medium for recording and erasing data, comprising:
a) a substrate;
b) an expansion layer adjacent said substrate, said expansion layer expanding upon local heating from radiation of a write beam at a write wavelength and forming a detectable bump thereon;
c) a soft reflective layer which deforms upon penetration of said detectable bump to become sufficiently thin above said bump to transmit at least about 10% of a read beam of light, a region around said bump being substantially more reflective of said read beam of light.

23. An optical recording medium for recording and erasing data, comprising:
a) a substrate;
b) an expansion layer adjacent said substrate, said expansion layer expanding upon local heating from radiation of a write beam at a write wavelength and forming a detectable bump thereon;
c) a soft reflective layer which deforms upon penetration of said detectable bump to become sufficiently thin above said bump to transmit at least about 10% of a read beam of light, said reflective layer retaining said detectable bump upon cessation of said write beam, and releasing said bump upon exposure to an erase beam of an erase wavelength, wherein said detectable bump fully traverses said soft reflective layer.

24. A recording medium as recited in claims 20, 21 or 22, wherein said soft reflective layer comprises a liquid or vapor.

25. A recording medium as recited in claims 20, 21 or 22, wherein said soft reflective layer comprises a material selected from the group consisting of mercury, gallium, cesium, rubidium, bismuth, alloys of gallium, alloys of indium, alloys of bismuth and combinations thereof.

26. A recording medium as recited in claims 20, 21 or 22, wherein said soft reflective layer comprises a material selected from the group consisting of aluminum, indium, tin, gold, alloys of aluminum, alloys of indium, alloys of tin, alloys of gold and combinations thereof.

27. A recording medium as recited in claims 20, 21 or 22, wherein said soft reflective layer is sufficiently thin above said bump to transmit at least about 20% of said read beam.

28. A recording medium as recited in claims 20, 21 or 22, wherein said soft reflective layer is sufficiently thin above said bump to transmit at least about 30% of said read beam.

29. A recording medium as recited in claims 20, 21 or 22, wherein the thickness of said reflective layer sufficient to allow at least about 10% transmission of a read beam of light is less than about 1000 Å.

30. A recording medium as recited in claims 20, 21 or 22, wherein the thickness of said reflective layer sufficient to allow at least about 10% transmission of a read beam of light is less than about 800 Å.

31. A recording medium as recited in claims 20, 21 or 22, wherein the thickness of said reflective layer sufficient to allow at least about 10% transmission of a read beam of light is less than about 600 Å.

32. A recording medium as recited in claims 20, 21 or 22, wherein the thickness of said reflective layer sufficient to allow at least about 10% transmission of a read beam of light is less than about 500 Å.

33. A recording medium as recited in claims 3, 8 and 20, wherein said retention layer has a Young's modulus of at least about 400,000 psi.

34. A medium as recited in claim 20 wherein said retention layer is between said expansion layer and said reflective layer.

35. A medium as recited in claim 22 wherein said reflective layer is adapted to retain said bump upon cessation of said write beam, and releasing said bump upon exposure to an erase beam of an erase wavelength.

* * * * *